(12) United States Patent
Weiss

(10) Patent No.: US 11,408,498 B2
(45) Date of Patent: Aug. 9, 2022

(54) SHIFTING ASSEMBLY AND MOBILE CARRIER COMPRISING SAME

(71) Applicant: Piaggio Fast Forward, Inc., Boston, MA (US)

(72) Inventor: Mitchell Weiss, Carlisle, MA (US)

(73) Assignee: Piaggio Fast Forward, Inc., Boston, MA (US)

( * ) Notice: Subject to any disclaimer, the term of this patent is extended or adjusted under 35 U.S.C. 154(b) by 346 days.

(21) Appl. No.: 16/660,560

(22) Filed: Oct. 22, 2019

(65) Prior Publication Data

US 2020/0124159 A1 Apr. 23, 2020

Related U.S. Application Data

(60) Provisional application No. 62/748,969, filed on Oct. 22, 2018, provisional application No. 62/748,958, filed on Oct. 22, 2018.

(51) Int. Cl.
| | |
|---|---|
| *F16H 1/12* | (2006.01) |
| *F16H 1/20* | (2006.01) |
| *F16H 57/02* | (2012.01) |
| *B62K 11/00* | (2006.01) |
| *F16H 61/00* | (2006.01) |

(Continued)

(52) U.S. Cl.
CPC ...... *F16H 57/02004* (2013.01); *B62K 11/007* (2016.11); *B62K 2202/00* (2013.01); *B62K 2204/00* (2013.01); *F16H 61/0006* (2013.01); *F16H 2048/02* (2013.01);

(Continued)

(58) Field of Classification Search
CPC ............................. B62K 11/007; B60K 17/043
See application file for complete search history.

(56) References Cited

U.S. PATENT DOCUMENTS

| | | | |
|---|---|---|---|
| 282,299 A | 7/1883 | Freeman | |
| 1,819,924 A | 8/1931 | Seppol | |

(Continued)

FOREIGN PATENT DOCUMENTS

| | | |
|---|---|---|
| CN | 102008379 | 4/2011 |
| CN | 104590476 | 5/2015 |

(Continued)

OTHER PUBLICATIONS

Japanese Office Action dated Sep. 21, 2021 issued in corresponding Japanese Application No. 2019-540385, with machine translation to English.

(Continued)

*Primary Examiner* — Jake Cook
(74) *Attorney, Agent, or Firm* — Sunstein LLP

(57) ABSTRACT

A linkage-based shifting assembly comprises first and second arms, having a first wheel rotatably coupled to a proximal end of the first arm and a second wheel rotatably coupled to a proximal end of the second arm. A shifting assembly is configured to couple to a chassis, wherein the shifting assembly is coupled to distal ends of the first and second arms and configured to cause a relative shifting motion between the chassis and the first and second wheels. The linkage-based shifting assembly can form part of a vehicle. The vehicle can be a two-wheeled vehicle. The vehicle can be a mobile carrier. The mobile carrier can be a two-wheeled vehicle.

18 Claims, 21 Drawing Sheets

(51) Int. Cl.
*F16H 48/00* (2012.01)
*F16H 57/00* (2012.01)

(52) U.S. Cl.
CPC ............. *F16H 2057/0056* (2013.01); *F16H 2057/02026* (2013.01); *F16H 2057/02039* (2013.01)

(56) References Cited

U.S. PATENT DOCUMENTS

| | | | |
|---|---|---|---|
| 3,123,173 A | 3/1964 | Jacobs | |
| 3,418,005 A | 12/1968 | Allina | |
| 3,776,353 A | 12/1973 | Roth | |
| 3,858,673 A | 1/1975 | Browning | |
| 3,921,740 A | 11/1975 | Forster | |
| 4,179,006 A | 12/1979 | Lenack et al. | |
| 4,222,452 A | 9/1980 | Fachini et al. | |
| 4,714,140 A | 12/1987 | Hatton et al. | |
| 4,794,999 A * | 1/1989 | Hester | A61G 5/065 180/8.2 |
| 4,986,387 A | 1/1991 | Thompson et al. | |
| 5,094,375 A | 3/1992 | Wright | |
| 5,248,011 A | 9/1993 | Richards | |
| 5,261,684 A | 11/1993 | Soto | |
| 5,322,140 A | 6/1994 | Bussinger | |
| 5,343,974 A | 9/1994 | Rabek | |
| 5,366,036 A * | 11/1994 | Perry | B60L 50/66 180/65.1 |
| 5,439,240 A * | 8/1995 | Tichenor | A61G 5/023 280/250.1 |
| 5,558,174 A | 9/1996 | Avitan et al. | |
| 5,669,619 A | 9/1997 | Kim | |
| 5,818,189 A | 10/1998 | Uchiyama et al. | |
| 6,260,645 B1 | 7/2001 | Pawlowski et al. | |
| 6,311,794 B1 * | 11/2001 | Morrell | G05B 13/042 180/8.3 |
| 6,328,125 B1 | 12/2001 | Van Den Brink et al. | |
| 6,553,271 B1 * | 4/2003 | Morrell | B60L 50/60 700/75 |
| 6,880,654 B2 | 4/2005 | Plishner | |
| 6,974,399 B2 | 12/2005 | Lo | |
| 7,017,696 B2 | 3/2006 | Pal | |
| 7,124,854 B2 | 10/2006 | Huang | |
| 7,185,726 B2 | 3/2007 | Young | |
| 7,337,862 B1 | 3/2008 | Greenley et al. | |
| 7,841,435 B2 | 11/2010 | Raue | |
| 7,938,210 B2 | 5/2011 | Kunzler et al. | |
| 7,996,109 B2 | 8/2011 | Zini et al. | |
| 7,997,361 B1 | 8/2011 | Bell et al. | |
| 8,002,060 B2 | 8/2011 | Komatsu | |
| 8,083,013 B2 | 12/2011 | Bewley et al. | |
| 8,096,378 B2 | 1/2012 | Xie | |
| 8,123,237 B2 | 2/2012 | Takemura | |
| 8,160,794 B2 | 4/2012 | Fuwa | |
| 8,170,781 B2 | 5/2012 | Fuwa | |
| 8,186,467 B2 | 5/2012 | Yoshino et al. | |
| 8,229,618 B2 | 7/2012 | Tolstedt et al. | |
| 8,490,723 B2 | 7/2013 | Heinzmann et al. | |
| 8,684,123 B2 | 4/2014 | Chen | |
| 8,807,250 B2 | 8/2014 | Chen | |
| 8,807,254 B2 | 8/2014 | Manus | |
| 8,932,170 B2 | 1/2015 | Ishizuka | |
| 8,985,264 B2 | 3/2015 | Shirley | |
| 9,010,474 B2 | 4/2015 | Martinelli et al. | |
| 9,045,190 B2 | 6/2015 | Chen | |
| 9,101,817 B2 | 8/2015 | Doerksen | |
| 9,364,766 B2 | 6/2016 | Mielniczek | |
| 9,511,811 B2 | 12/2016 | Andreev | |
| 9,557,740 B2 | 1/2017 | Crawley | |
| 9,630,447 B2 | 4/2017 | Yoshino et al. | |
| 9,701,012 B1 | 7/2017 | Theobald | |
| 9,764,592 B1 | 9/2017 | Hays et al. | |
| 9,776,327 B2 | 10/2017 | Pinter et al. | |
| 9,789,017 B2 | 10/2017 | Hays et al. | |
| 9,789,415 B2 | 10/2017 | Mielniczek | |
| 9,849,047 B2 | 12/2017 | Hays et al. | |
| 10,076,954 B2 | 9/2018 | Burtov et al. | |
| 10,093,168 B2 | 10/2018 | Hays et al. | |
| 10,144,478 B2 | 12/2018 | Ying et al. | |
| 10,173,738 B2 | 1/2019 | Schnapp et al. | |
| 10,223,848 B2 | 3/2019 | Browning et al. | |
| 10,293,676 B2 | 5/2019 | Schnapp et al. | |
| 10,322,718 B2 | 6/2019 | Lian et al. | |
| 2001/0042650 A1 | 11/2001 | Van Den Berg | |
| 2002/0011368 A1 | 1/2002 | Berg | |
| 2002/0121394 A1 * | 9/2002 | Kamen | A61G 5/061 180/41 |
| 2002/0149172 A1 | 10/2002 | Field et al. | |
| 2004/0124023 A1 | 7/2004 | Plishner | |
| 2004/0182625 A1 | 9/2004 | Pal | |
| 2005/0016785 A1 | 1/2005 | Young | |
| 2005/0056479 A1 | 3/2005 | Huang | |
| 2005/0176542 A1 | 8/2005 | Lo | |
| 2006/0254841 A1 | 11/2006 | Strong | |
| 2007/0129849 A1 | 6/2007 | Zini et al. | |
| 2008/0041654 A1 | 2/2008 | Raue | |
| 2008/0230285 A1 | 9/2008 | Bewley et al. | |
| 2008/0245593 A1 | 10/2008 | Kim | |
| 2009/0166112 A1 | 7/2009 | Yoshino et al. | |
| 2009/0315286 A1 | 12/2009 | Takemura | |
| 2009/0319124 A1 | 12/2009 | Fuwa | |
| 2010/0057319 A1 | 3/2010 | Inaji et al. | |
| 2010/0063663 A1 | 3/2010 | Tolstedt et al. | |
| 2010/0070132 A1 | 3/2010 | Doi | |
| 2010/0161206 A1 | 6/2010 | Naito | |
| 2010/0168993 A1 | 7/2010 | Doi et al. | |
| 2010/0252338 A1 | 10/2010 | Xie | |
| 2011/0010066 A1 | 1/2011 | Fuwa | |
| 2011/0208357 A1 | 8/2011 | Yamauchi | |
| 2011/0209929 A1 | 9/2011 | Heinzmann et al. | |
| 2011/0220427 A1 | 9/2011 | Chen | |
| 2011/0303035 A1 | 12/2011 | Niebergall et al. | |
| 2013/0032423 A1 | 2/2013 | Chen | |
| 2013/0069420 A1 | 3/2013 | Manus | |
| 2013/0228385 A1 | 9/2013 | Chen | |
| 2014/0011625 A1 | 1/2014 | Thompson | |
| 2014/0116799 A1 | 5/2014 | Pettigrew et al. | |
| 2014/0131126 A1 | 5/2014 | Martinelli et al. | |
| 2014/0230602 A1 | 8/2014 | Shirley | |
| 2014/0326525 A1 | 11/2014 | Doerksen | |
| 2015/0012163 A1 | 1/2015 | Crawley | |
| 2015/0093956 A1 | 4/2015 | Mielniczek | |
| 2016/0031515 A1 | 2/2016 | Andreev | |
| 2016/0068056 A1 | 3/2016 | Burtov et al. | |
| 2016/0229058 A1 | 8/2016 | Pinter et al. | |
| 2016/0303900 A1 | 10/2016 | Yoshino et al. | |
| 2016/0325585 A1 | 11/2016 | Hays et al. | |
| 2016/0332086 A1 | 11/2016 | Mielniczek | |
| 2016/0346142 A1 | 12/2016 | Hays et al. | |
| 2018/0009311 A1 | 1/2018 | Hays et al. | |
| 2018/0072366 A1 * | 3/2018 | Kama | B62K 11/007 |
| 2018/0082502 A1 | 3/2018 | Browning et al. | |
| 2018/0105033 A1 | 4/2018 | Schnapp et al. | |
| 2018/0105215 A1 | 4/2018 | Schnapp et al. | |
| 2018/0148121 A1 | 5/2018 | Ying et al. | |
| 2018/0230285 A1 | 8/2018 | Bueno Lopez et al. | |
| 2018/0237001 A1 | 8/2018 | Lian et al. | |
| 2018/0237065 A1 | 8/2018 | Yamamoto et al. | |
| 2019/0031017 A1 | 1/2019 | Hays et al. | |
| 2020/0047826 A1 | 2/2020 | Schnapp et al. | |

FOREIGN PATENT DOCUMENTS

| | | |
|---|---|---|
| DE | 202007011698 | 1/2009 |
| EP | 0705724 | 4/1996 |
| EP | 3705724 | 4/1996 |
| EP | 1889743 | 6/2008 |
| EP | 2058216 | 5/2009 |
| EP | 2163467 | 3/2010 |
| GB | 2516619 | 2/2015 |
| JP | 59195965 | 12/1984 |
| JP | 57760 | 2/1993 |
| JP | 0620176 U | 3/1994 |
| JP | H0692273 | 4/1994 |

(56) References Cited

FOREIGN PATENT DOCUMENTS

| | | |
|---|---|---|
| JP | 06134049 | 5/1994 |
| JP | 06061680 | 8/1994 |
| JP | 0920250 | 1/1997 |
| JP | 09215713 | 8/1997 |
| JP | 2000502636 | 3/2000 |
| JP | 2000355293 | 12/2000 |
| JP | 2001339812 | 12/2001 |
| JP | 2004129435 | 4/2004 |
| JP | 2006116186 | 5/2006 |
| JP | 2006123854 | 5/2006 |
| JP | 3993883 | 10/2007 |
| JP | 2007313980 | 12/2007 |
| JP | 2008055951 | 3/2008 |
| JP | 2009040379 | 2/2009 |
| JP | 2012122250 | 6/2012 |
| JP | 2014519446 | 8/2014 |
| JP | 2015523933 | 8/2015 |
| JP | 2019003540 | 1/2019 |
| KR | 200412471 | 3/2006 |
| KR | 2020080003926 | 9/2008 |
| KR | 101272035 | 6/2013 |
| KR | 101598132 | 2/2016 |
| WO | 0115962 | 3/2001 |
| WO | 03065963 | 8/2003 |
| WO | 2008067822 | 6/2008 |
| WO | 2011107674 | 9/2011 |
| WO | 2015140767 | 9/2015 |
| WO | 2018075013 | 4/2018 |
| WO | 2018140071 | 8/2018 |
| WO | 2019075002 | 4/2019 |
| WO | 2019213264 | 11/2019 |

OTHER PUBLICATIONS

Extended European Search Report dated Oct. 7, 2021 issued in corresponding European Application No. 19795777.2
Loper et al. "Mobile human-robot teaming with environmental tolerance", Human-Robot Interaction (HRI), 4th ACM/IEEE International Conference, Mar. 9, 2009, pp. 157-164.
Zender et al. "Human and Situation-Aware People Following", Robot and Human Interactive Communication, The 16th IEEE International Symposium, Aug. 26, 2007, pp. 1131-1136.
International Search Report and Written Opinion dated Jan. 17, 2020 issued in corresponding International Application No. PCT/US2019/057472.
European Office Action dated Jul. 16, 2020 issued in corresponding European Application No. 16790806.0.
Extended European Search Report dated Aug. 3, 2021 issued in corresponding European Application No. 18866624.2.
Beroud, Annick. "L'intralogistique au service de la performance" a la matinale de l'Aslog (with English machine translation) L'antenne, Sep. 27, 2016. Retrieved from URL: http://www.lantenne.com/L-intralogistique-au-service-de-la-performance-a-la-matinale-de-l-Aslog_a33383.html.
International Search Report and Written Opinion dated Dec. 14, 2018 issued in corresponding International Application No. PCT/US18/55135.
International Search Report and Written Opinion dated Jul. 22, 2019 issued in corresponding International Application No. PCT/US2019/030208.
International Search Report and Written Opinion dated Oct. 24, 2017 issued in corresponding International Application No. PCT/US2017/031944.
Italian Search Report dated Sep. 27, 2017 issued in corresponding Italian Application No. 2017000010, with English translation.
Goher, K. "A two-wheeled machine with a handling mechanism in two different directions"; Robot. Biomim, vol. 3, No. 17; Publication [online], 2016 [retrieved Nov. 26, 2018).Retrieved from the Internet: URL: https://jrobio.springeropen.com/track/pdf/10.1186/s40638-016-0049-8; entire document.
Goher, K. M., et al. Dynamic Modeling and Control of a Two Wheeled Robotic Vehicle With a Virtual Payload, ARPN Journal of Engineering and Applied Sciences, vol. 6, No. 3, Mar. 2011.
Hay, Benjamin. TwinswHeel, le livreur de colis de demain? (with English machine translation) Tumblr French IoT, Oct. 6, 2016. Retrieved from URL: htlp://french-iot.tumblr.com/post/151417346436/twinswheel-le-livreur-de-colis-de-demain-la.
Hu, J., & Yan, G. (2014). Analysis of two-wheeled self-balancing mobile robots based on ADRC. Jidian Gongcheng/Mechanical & Electrical Engineering Magazine, 31(2), 159-164. doi:http://dx.doi.org/10.3969/j.ssn.1001-4551.2014.02.006—Abstract Only.
Huang et al., "Modeling and Velocity Control for a Novel Narrow Vehicle Based on Mobile Wheeled Inverted Pendulum", IEEE Transactions on Control Systems Technology, vol. 21 No. 5, Sep. 2013, pp. 1607-1617. (Year: 2013).
Huang et al., "Nonlinear Disturbance Observer-Based Dynamic Surface Control of Mobile Wheeled Inverted Pendulum", IEEE Transactions on Control Systems Technology, vol. 23 No. 6, Nov. 2015, pp. 2400-2407. (Year 2015).
International Search Report and Written Opinion dated Feb. 20, 2017 in PCT Application No. PCT/US2016/057529.
Ji, P., Zhu, Y., Cheng, C. et al. (2014). Design of self-balancing two-wheeled vehicle control system based on STM32. Dianzi Keji—Electronic Science and Technology, 27(11), 96-99, 105. Retrieved from http://search.proquest.com/docview/1651444797?accountid-10920—Abstract Only.
Larimi, S. R., Zarafshan, P., & Moosavian, S. A. A. A new stabilization algorithm for a two-wheeled mobile robot aided by reaction wheel. Journal of Dynamic Systems, Measurement, and Control (Transactions of the ASME), vol. 137, No. 1, Jan. 2015.
Libeskind, Jerome. A quoi ressemblera le dernier kilometre dans 10 ans? (with English machine translation) Logicites. Sep. 26, 2016. Retrieved from URL: http://www.logicites.fr/2016/09/26/a-quoi-ressemblera-dernier-Kilometre-10-ans/.
Rahman, M. T. A., Ahmad, S., Akmeliawati, R. et al. Centre of gravity (C.O.G)-based analysis on the dynamics of the extendable double-link two-wheeled mobile robot. IOP Conference Series: Materials Science and Engineering, vol. 53, No. 1, 2013.
Ruan, X., Chen, J., Cai, J. et al. (2011). Research on stable control for two-wheeled self-balancing robot in complex environment. Beijing Gongye Daxue Xuebao (Journal of Beijing University ofTechnology), 37(9), 1310-1316. Retrieved from http:1/search .proquest.com/docview/963872724 ?accountid= 10920— Abstract Only.
Sales, J., Marti, J_ V., Mann, R et al. CompaRob: the shopping cart assistance robot. International Journal of Distributed Sensor Networks, 2016.
van der Wijk, V., & Herder, J. L. Force balancing of variable payload by active force-balanced reconfiguration of the mechanism. In Reconfigurable Mechanisms and Robots, 2009. ReMAR 2009. ASME/IFToMM International Conference, IEEE, Jun. 2009.
Wang, Kun, et al. Enhanced active dynamic balancing of the planar robots using a three-rotating-bar balancer, Mvances in Mechanical Engineering, vol. 8, No. 4, pp. 1-10, 2016.
Wu, K., Li, W., Liu, C et al. (2006). Dynamic control of two-wheeled mobile robot. Yuhang Xuebao I Journal of 13 Astronautics, 27(2), 272-275. Retrieved from http:l/search.proquest.com/docview/29224261 ?accountid=10920—Abstract Only.
YouTube video uploaded on Nov. 21, 2016, titled "TwinswHeel M6 1945 Nov. 18, 2016" downloaded from https:l/www.youtube.com/watch?v=e3laoGU56nY&feature=youtu.be on Jan. 19, 2017.
YouTube video uploaded on Sep. 15, 2016, titled "TwinswHeel Lyon Sep. 13, 2016 EN" downloaded from https:l/www.youtube.com/watch?v=ysYtN3Wm5Dw&feature=youtu.be on Jan. 19, 2017.
Zhao, Y., Woo, C., & Lee, J. (2015). Balancing control of mobile manipulator with sliding mode controller. International Conference on Control, Automation and Systems (ICCAS), 802-805.
Japanese Office Action dated Feb. 2, 2021 issued in corresponding Japanese Application No. 2019-540385, with machine translation to English.
Japanese Office Action dated Dec. 1, 2020 issued in corresponding Japanese Application No. 2019-521784, with English translation.

(56) References Cited

OTHER PUBLICATIONS

Japanese Office Action dated Jun. 8, 2021 issued in corresponding Japanese Application No. 2021-510268, with English summary.
Goher, K. "A two-wheeled machine with a handling mechanism in two different directions"; Robot. Biomim, vol. 3, No. 17; Publication [online]. 2016 [retrieved Nov. 26, 2018).Retrieved from the internet: URL: https://jrobio.springeropen.com/track/pdf/10.1186/540638-01 6-0049-8; entire document.
European Office Action dated Nov. 4, 2020 issued in corresponding European Application No. 17725412.5.
Japanese Notice of Allowance dated Jan. 18, 2022 issued in corresponding Japanese Application No. 2019-540385, with machine translation to English.

* cited by examiner

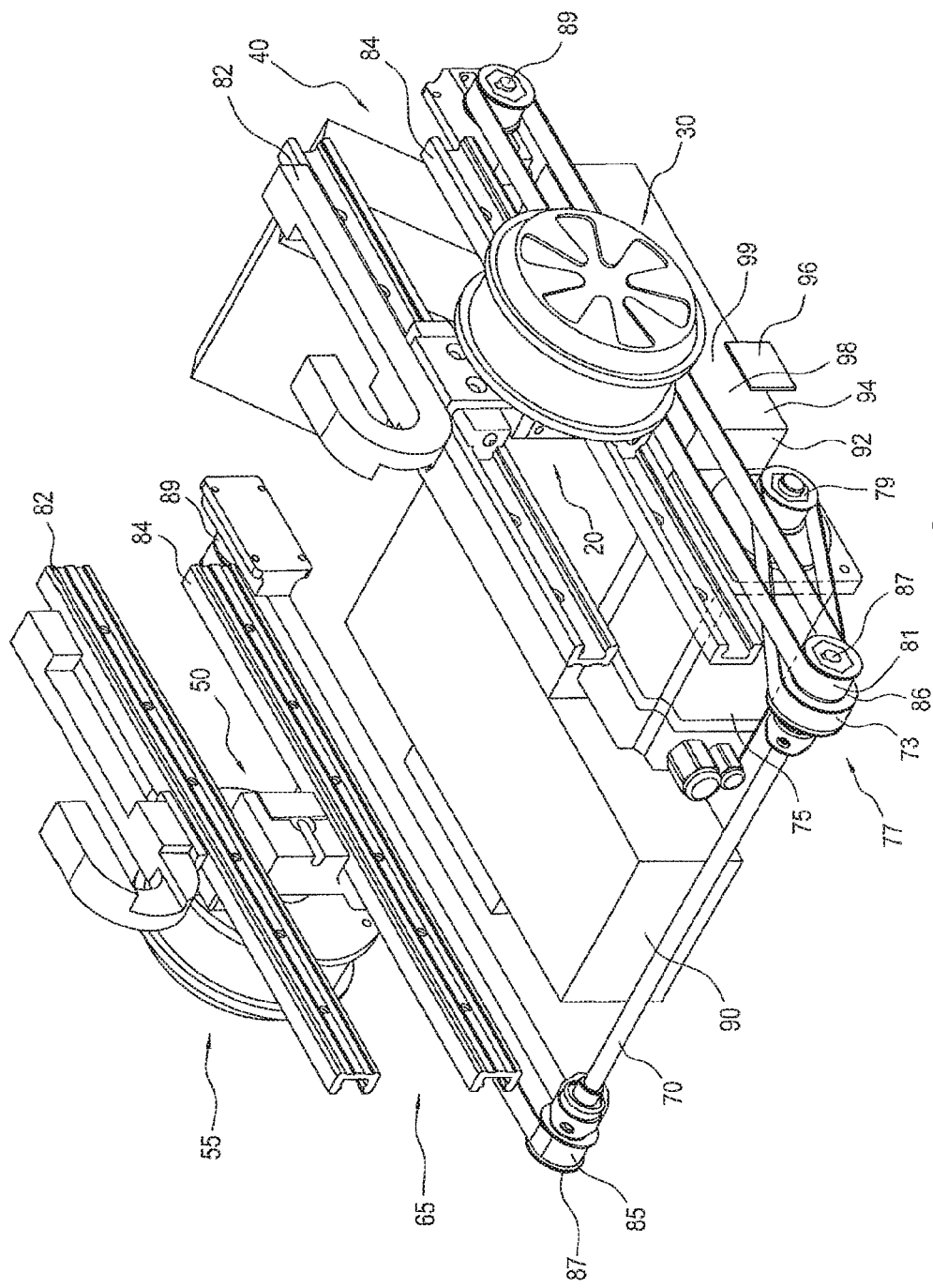

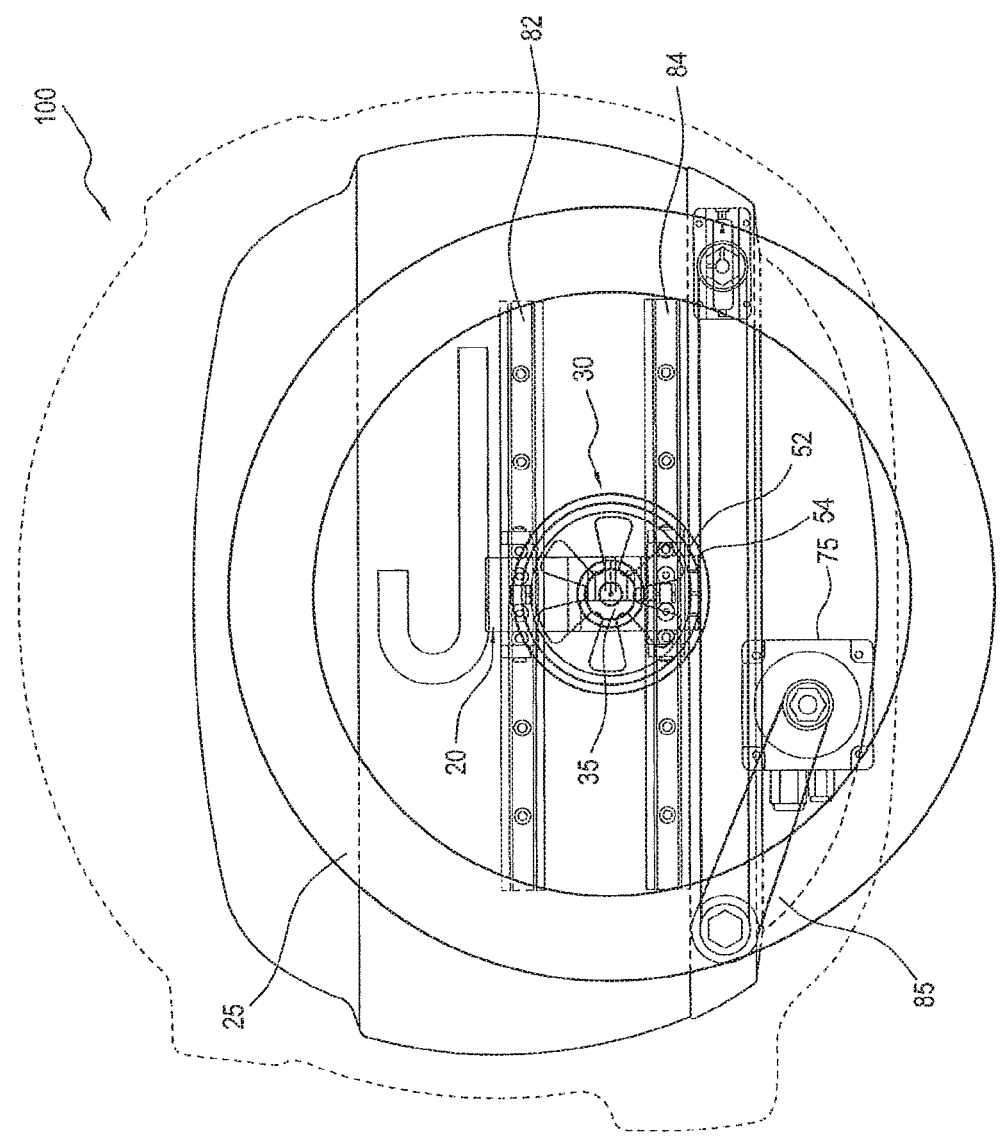

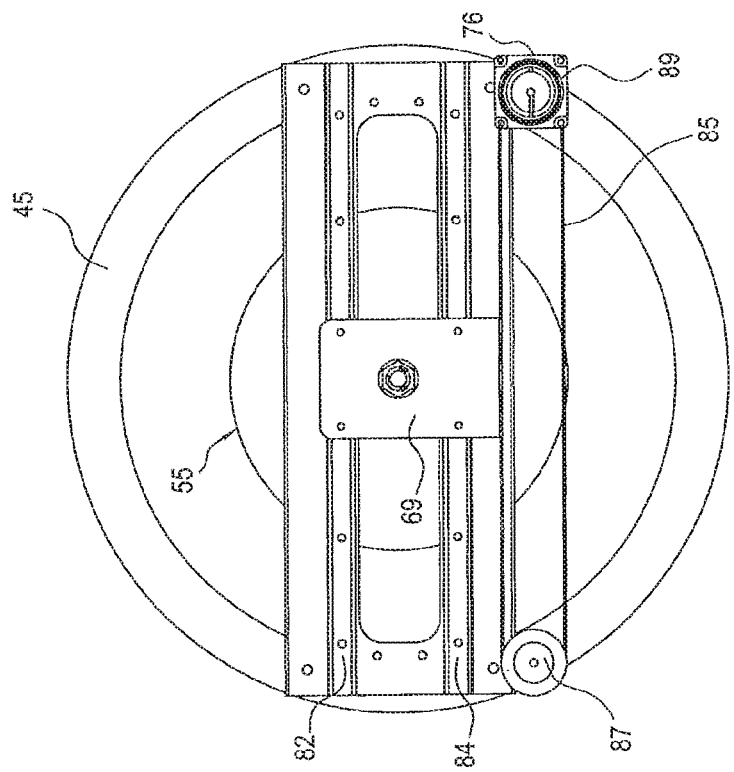
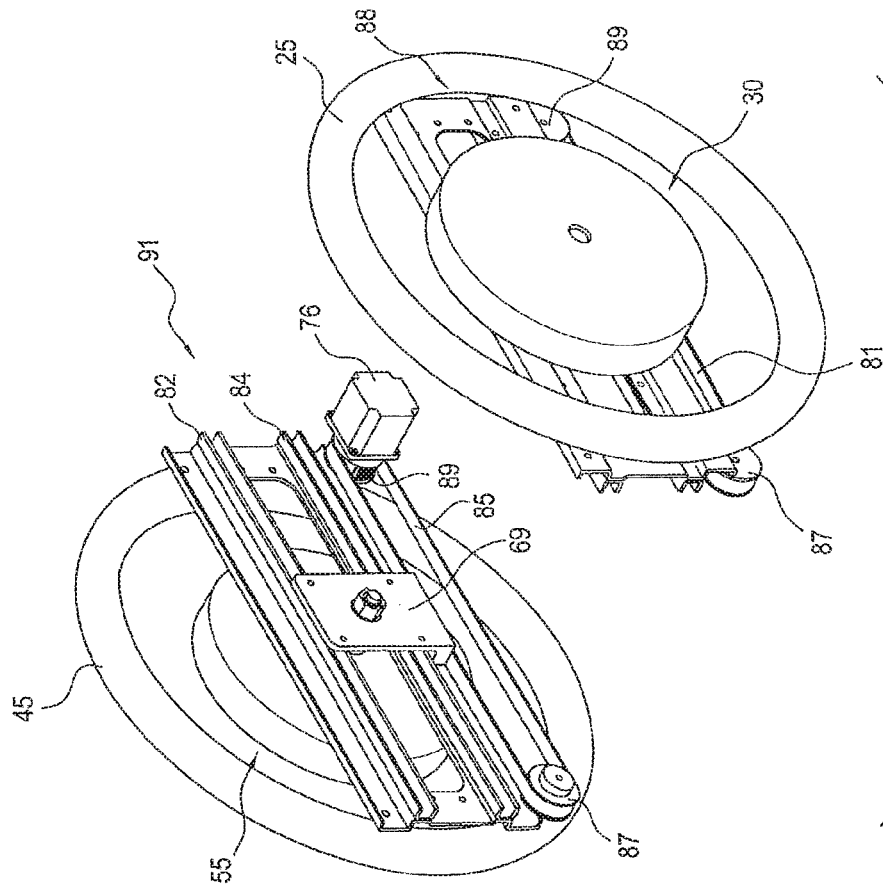
FIG. 7B
FIG. 7A

Carrier with wheel centered

Carrier with wheel back, load forward

Carrier with wheel forward, load back

Moving from sitting to standing and driving positions (left to right):

SHIFTING ASSEMBLY AND MOBILE CARRIER COMPRISING SAME

CROSS REFERENCE TO RELATED APPLICATIONS

The present application claims priority to U.S. Provisional Patent Application No. 62/748,958 entitled Linkage-based Shifting Assembly and Mobile Carrier Comprising Same, filed Oct. 22, 2018, and to U.S. Provisional Patent Application No. 62/748,969 entitled Shifting Assembly and Mobile Carrier Comprising Same, filed Oct. 22, 2018, each of which is incorporated herein in its entirety.

FIELD OF INTEREST

The present description relates generally to vehicles, and more particularly, but not exclusively, to stabilization systems for two-wheeled vehicles having axially aligned wheels.

BACKGROUND

A growing number of vehicles and/or robotic vehicles (or "robots") are becoming available for the purpose of transporting goods. The typical vehicles and/or robots use three, four or six wheels to provide propulsion and steering control during normal operation of the vehicle. Such vehicles and/or robots rely upon static stability and are designed for stability in all operating conditions via the location of the wheels. A separation distance between the wheels in the longitudinal, or backwards and forward direction, balances out applied torques due to gravity or inclines. Thus, in the typical vehicle stability is achieved by implementing an appropriate separation distance between the wheels in the longitudinal direction of the vehicle, thereby making the vehicle more resilient to disruptions along the lateral axis.

However, an issue exists in situations where attempts have been made to transport goods in two-wheeled vehicle having wheels located in the lateral, or side-by-side, direction, versus in the traditional longitudinal direction. The challenge of using the vehicles having only two wheels mounted in the lateral, side-by-side configuration is in maintaining dynamic stability of the vehicle during normal operation. This problem does not generally exist in vehicles having 3 or more wheels with longitudinal and lateral separation between wheels.

SUMMARY

In accordance with one aspect of the present disclosure, provided is a linkage-based shifting apparatus, comprising first and second arms, a first wheel rotatably coupled to a proximal end of the first arm, and a second wheel rotatably coupled to a proximal end of the second arm. A shifting assembly configured to couple to or form part of a chassis, the shifting assembly operatively coupled to the first and second arms to cause a relative shifting motion between the chassis and the first and second wheels.

In various embodiments, the first and second wheels share a common axis of rotation.

In various embodiments, the apparatus further comprises at least one motor configured to drive at least one of the first a second wheels.

In various embodiments, the apparatus further comprises a plurality of motors configured to independently drive the first and the second wheels.

In various embodiments, the apparatus further comprises a first pulley system operatively disposed between the first wheel and a first drive motor.

In various embodiments, the apparatus further comprises a second pulley system operatively disposed between the second wheel and a second drive motor.

In various embodiments, the shifting assembly is disposed between the first and second arms.

In various embodiments, the shifting assembly further comprises a shifter motor configured to drive a capstan that is coupled to the chassis via at least one belt, strap, or rope.

In various embodiments, the shifting assembly further comprises at least one gear coupling the shifter motor to the capstan.

In various embodiments, the at least one gear comprises a first gear driven by the shifter motor and a second gear driven by the first gear, wherein the second gear is configured to rotate the capstan.

In various embodiments, the second gear and the capstan are operatively coupled together and coaxial.

In various embodiments, the shifting assembly further comprises an encoder operatively coupled to the second gear and/or capstan to measure an angle of rotation of the second gear.

In various embodiments, the shifting assembly is configured to cause the chassis to shift forward and/or rearward relative to the first and second wheels.

In various embodiments, the shifting assembly is configured to cause the chassis to shift forward relative to the first and second wheels for acceleration.

In various embodiments, the shifting assembly is configured to cause the chassis to shift rearward relative to the first and second wheels for deceleration.

In various embodiments, the shifting assembly is configured to cause the chassis to shift forward relative to the first and second wheels to place the body in a sitting position. In the sitting position, the first and second wheels can be in a still, non-rotating state.

In various embodiments, the shifting assembly is configured to cause the chassis to transition from the sitting position to an acceleration position.

In various embodiments, the shifting assembly is configured to cause the chassis to transition from an acceleration position to a deceleration position.

In various embodiments, the shifting assembly is configured to cause the chassis to transition from the deceleration position to the sitting position.

In accordance with other aspects of the inventive concepts, provided is a mobile carrier system, comprising a body including a chassis, first and second arms, a first wheel rotatably coupled to a proximal end of the first arm, and a second wheel rotatably coupled to a proximal end of the second arm. A shifting assembly is coupled to or integral with the chassis, wherein the shifting assembly is also operatively coupled to the first and second arms to cause a relative shifting motion between the chassis and the first and second wheels.

In various embodiments, the first and second wheels share a common axis of rotation.

In various embodiments, the system further comprises at least one motor configured to drive at least one of the first and second wheels.

In various embodiments, the system further comprises a plurality of motors configured to independently drive the first and second wheels.

In various embodiments, the system further comprises a first pulley system operatively coupled between the first wheel and a first drive motor.

In various embodiments, the system further comprises a second pulley system operatively coupled between the second wheel and a second drive motor.

In various embodiments, the shifting assembly is disposed between the first and second arms.

In various embodiments, the shifting assembly further comprises a shifter motor configured to drive a capstan configured to couple to the chassis via at least one belt, strap, or rope.

In various embodiments, the shifting assembly further comprises at least one gear operatively coupling the shifter motor to the capstan.

In various embodiments, the at least one gear comprises a first gear driven by the shifter motor and a second gear driven by the first gear, wherein the second gear is configured to rotate the capstan.

In various embodiments, the second gear and the capstan are operatively coupled and coaxial.

In various embodiments, the shifting assembly further comprises an encoder operatively coupled to the second gear and/or capstan to measure an angle of rotation of the second gear.

In various embodiments, the shifting assembly is configured to cause the chassis to shift forward and/or rearward relative to the first and second wheels.

In various embodiments, the shifting assembly is configured to cause the chassis to shift forward relative to the first and second wheels for acceleration.

In various embodiments, the shifting assembly is configured to cause the chassis to shift rearward relative to the first and second wheels for deceleration.

In various embodiments, the shifting assembly is configured to cause the chassis to shift forward relative to the first and second wheels to place the body in a sitting position. In the sitting position, the first and second wheels can be in a still, non-rotating state.

In various embodiments, the shifting assembly is configured to cause the chassis to transition from the sitting position to an acceleration position.

In various embodiments, the shifting assembly is configured to cause the chassis to transition from the acceleration position to a deceleration position.

In various embodiments, the shifting assembly is configured to cause the chassis to transition from the deceleration position to the sitting position.

In various embodiments, the body defines a storage compartment.

In various embodiments, the system further comprises a set of user interface devices.

In various embodiments, the set of user interface devices comprises one or more button, touch screen, sensor, camera, range finder, light emitting device, audio input device, and/or audio output device.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 3 illustrates a perspective view of various components of a linear actuator system of the vehicle, according to aspects of the inventive concepts;

FIG. 4 is a side view illustrating the linear actuator system and various components of a wheel assembly including a hub motor, according to aspects of the inventive concepts;

FIG. 7A illustrates a perspective view of various components of a linear actuator system of the vehicle, according to aspects of the inventive concepts;

FIG. 7B illustrates a side view of the various components of a linear actuator system of the vehicle, according to aspects of the inventive concepts;

DETAILED DESCRIPTION OF PREFERRED EMBODIMENTS

Figure 1:
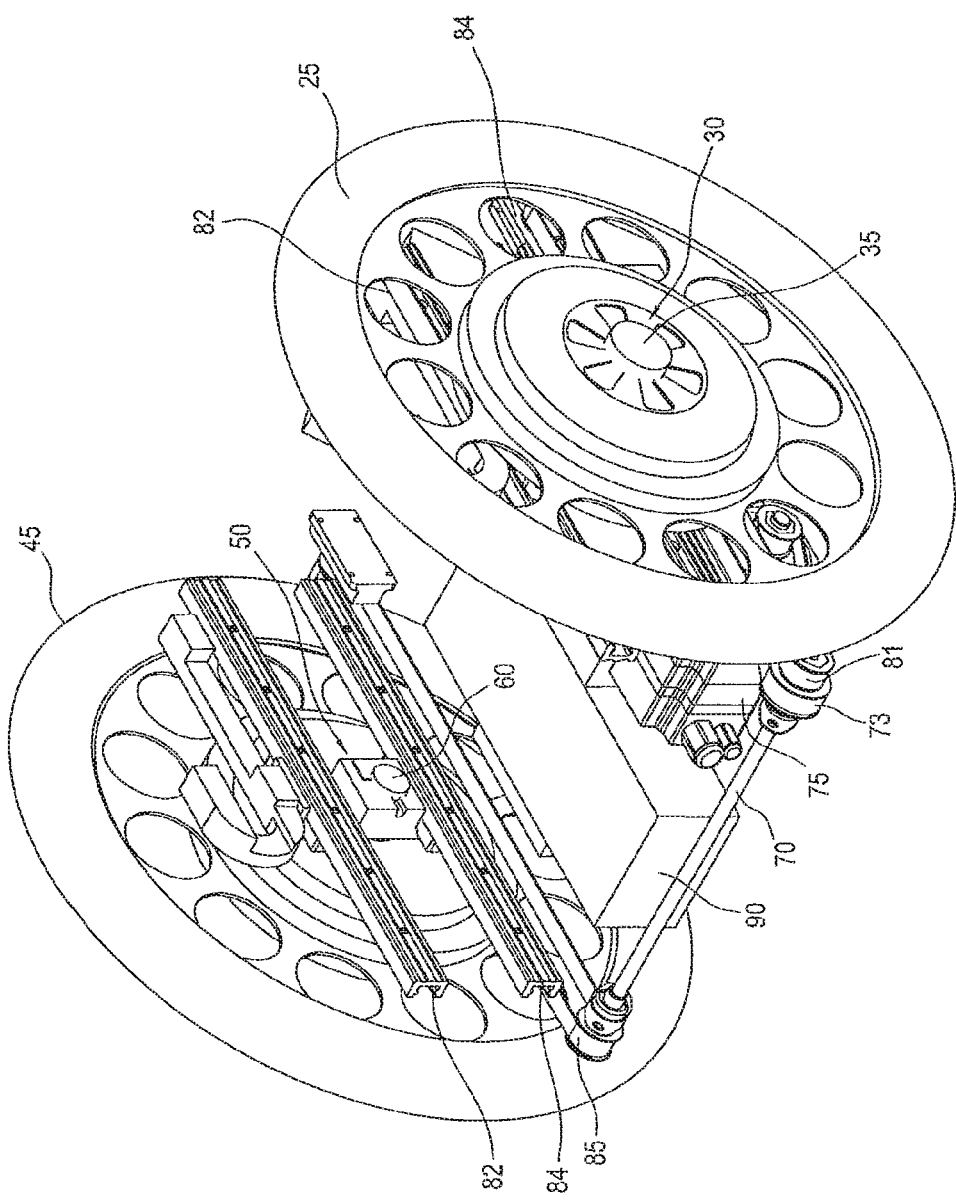
FIG. 1 is a perspective view of various components of a first embodiment of a vehicle, according to aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

A growing number of vehicles or robotic vehicles (or robots) are becoming available for the purpose of transporting goods. The typical vehicles use three, four or six wheels to provide propulsion and steering control. Such vehicles rely on static stability and are designed for stability in all operating conditions via the location of the wheels. A separation distance in the longitudinal, or backwards and forward direction balances out applied torques due to gravity or inclines experienced by the vehicle during normal operation (e.g., braking, acceleration, and deceleration). The greater the separation distance (wheelbase), the more resilient to disruptions along the longitudinal axis the vehicle will be.

An alternate approach involves using a two-wheeled vehicle with the wheels located in the lateral or side-by-side direction. Such a vehicle is particularly maneuverable if the two wheels are decoupled such that they are independently propelled. The turning radius can be as small as the one half the distance between the wheels, if one wheel is propelled forward and the other backward, or to any greater degree via increasing the difference in speed between the inner and outer wheel of the turn. However, the challenge of using such a two-wheeled vehicle with the wheels located in the lateral, or side-by-side direction is that it must be dynamically stabilized to maintain the vehicle's vertical orientation, which is a requirement for most applications. Propulsion of such a laterally-mounted, two-wheeled vehicle may be accomplished by applying torque at the center of the vehicle wheel(s) with a motor, potentially with a gearbox to optimize motor performance. Alternatively, the wheel could be propelled with a rim drive.

Dynamic stabilization, also referred to as active balancing, is a technique in which a control system actively maintains the stability of the vehicle while it is operating, e.g., driving, turning. In a laterally-wheeled vehicle, as discussed in the various implementations of the present disclosure, the pitch orientation of the vehicle is continually sensed and a correcting torque is applied. In various embodiments, there are two primary means of applying such a correcting torque, either (1) via the wheel motors themselves or (2) via the motion of a counterweight moving forward and backward in the longitudinal direction of the vehicle.

In the various implementations of the present disclosure detailed herein, dynamic stabilization is achieved via both the motor torque and a counterweight. However, in a deviation from previously developed stabilization systems, such as that described in PCT/US2016/057529, the entire contents of which are incorporated herein for reference, rather than using a separate counterweight, in the disclosed implementations, the wheels move relative to the body of the vehicle as a whole, such that the body and chassis act as the counterweight. This allows significantly more control authority, as over half of the vehicle mass can be used for the level arm. One artifact of this approach is that the propulsion force causing rotation of the wheel is applied at the center of the wheel, instead of using a rim drive. The so-called hub drive can be driven by a motor integrated into or positioned beside the wheel. Each wheel can be independently controlled. Depending on the various implementations described herein, the wheel to motor mass ratio can be as little as ⅓ of the total vehicle mass, allowing ⅔ of the mass for control.

In accordance with various aspects of the present disclosure, navigation may be accomplished via a "following" mode in which the vehicle (or robot) is virtually linked to a human or another vehicle and executes a "leader" path. Alternatively, navigation may be accomplished via an autonomous mode in which the vehicle travels between preset waypoints. In both cases, active obstacle detection and avoidance is implemented. Both indoor and outdoor operation can be achieved using visual SLAM (simultaneous localization and mapping) technologies and approaches.

Disclosed herein are various embodiments of a robotic follower and/or carrier vehicle and its components. FIG. 1 illustrates a perspective view of various components a vehicle 100, according to aspects of the inventive concepts. The robotic vehicle 100 can be a robotic follower vehicle that is configured with a storage or carrier compartment. The robotic vehicle can identify a leader, e.g., a human, and then follow the leader.

Figure 2:
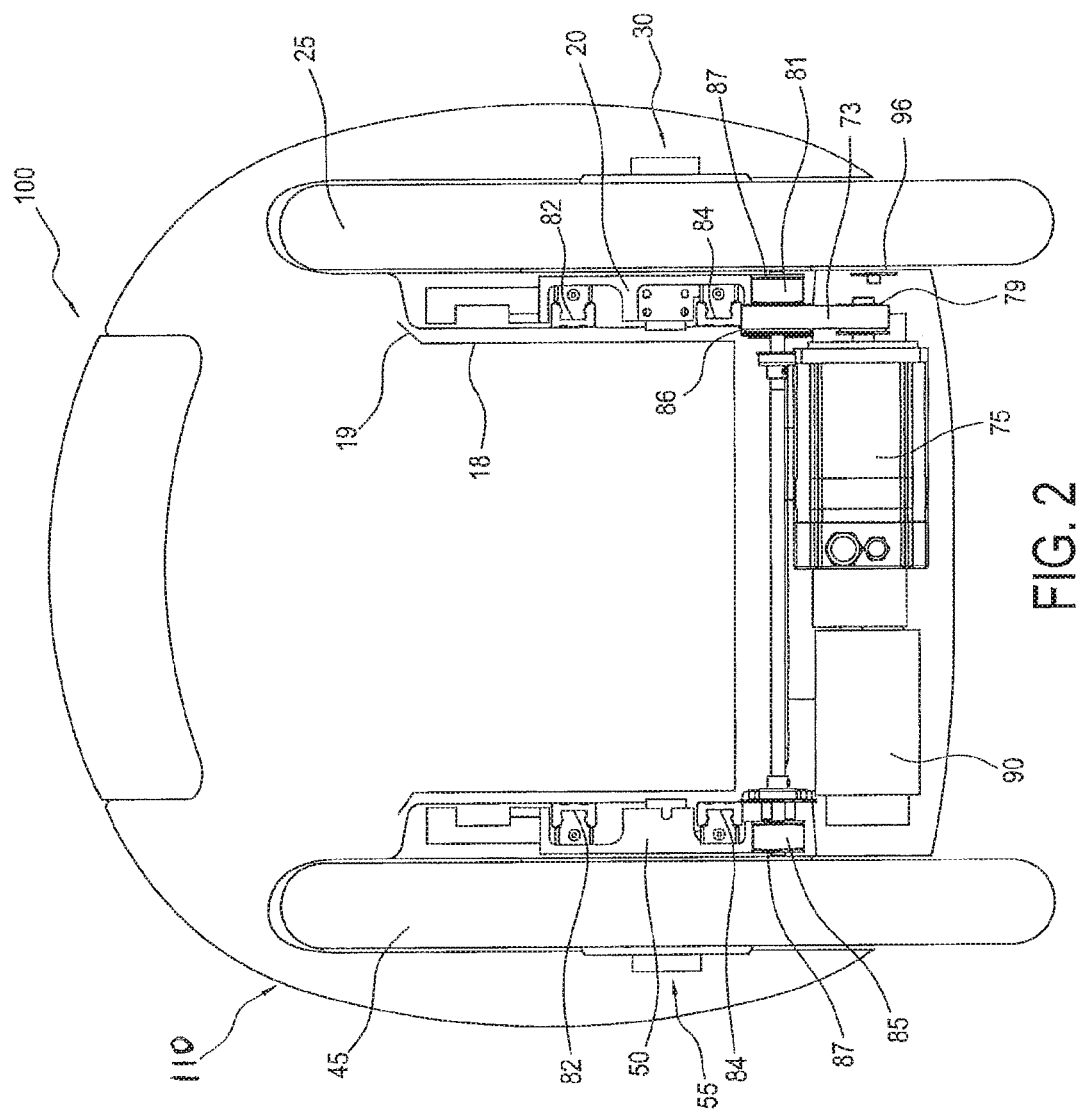
FIG. 2 illustrates a rear view of the vehicle, according to aspects of the inventive concepts.

FIG. 2 illustrates a rear view of the various components of the vehicle 100, according to aspects of the inventive concepts. Referring to FIGS. 1 and 2, the vehicle 100 includes a chassis 15. The chassis 15 is the structural frame of the vehicle 100, and supports a body 110 that forms a protective shell of the vehicle 100.

In some implementations, the vehicle 100 further includes at least one wheel carriage 20, as best shown in FIG. 2. The wheel carriage 20 is moveably coupled to, and longitudinally displaceable relative to the chassis, as will be discussed in further detail below. The wheel carriage 20 is configured such that a wheel, e.g., wheel 25, and its corresponding motor 30 may be rotatably coupled thereto. As will be described in further detail below with reference to FIGS. 5A and 5B, a wheel carriage is coupled to a linear actuator system which allows the wheel carriage to translate back and forth in the longitudinal direction of the chassis, in order to control a pitch and balancing of the chassis 15. For example, as the wheel carriage is translated by the linear actuator system, the corresponding wheel, which is mounted on the wheel carriage, translates along with the wheel carriage relative to the chassis. This causes a relative translation of the chassis 15 in the opposite direction, thereby acting as a counterweight, and adjusting the pitch and center of gravity of the chassis. The present disclosure thus provides the advantage of using the actual body of the vehicle 100 to act as a counterweight and maintain a near-zero pitch angle by moving the chassis 15 relative to the wheels, e.g., wheel 25 and/or wheel 45.

In an embodiment, the vehicle includes a first wheel 25 and a second wheel 45, disposed on opposite sides of the vehicle body 110. Those skilled in the art having the benefit of this disclosure will appreciate that in elements described using the term "second" are substantially duplicates of mirrors of items described using the term "first," each of the "second" elements having connections and functioning in substantially the same manner as the corresponding elements "first" elements.

As discussed above, the first wheel 25 may be rotationally mounted on a first wheel carriage 20 and coupled to the chassis 15 through the first wheel carriage 20. Similarly, the second wheel 45 may be rotationally mounted on a second wheel carriage 50 and coupled to the chassis 15 through the second wheel carriage 50. The first and second wheels 25 and 45 each include a geometric center and a diameter. The size of the wheels can vary depending on the needs for torque, ground clearance, and the desired location of the center of gravity relative to the center of rotation of the vehicle 100. Preferably, however, the first and second wheels are the same size. In some aspects, the size of the vehicle 100 may vary between 12 inches to 30 inches tall, with similar widths. In the illustrated figures, the diameters of the wheels 25 and 45 are shown to be smaller than the length and height of the vehicle 100. However the various implementations of the present disclosure are not limited thereto. In some instances the opposite could apply. That is, the diameter of the wheels 25 and 45 may be larger than the length and height of the vehicle 100.

In some implementations, the diameter of the wheels 25 and 45 can be between 12 and 28 inches, inclusive. In certain implementations, the diameter of the wheels 25 and 45 is at least 75% of the height, length, width, and/or diameter of the chassis 15 and/or vehicle 100. Each wheel 25 and 45 may also include a rim substantially defining an outer surface of the wheel 25 and 45. A tire may be disposed around each rim. The tires may be removably mounted to the respective rims 101, such that each tire rotates with its rim. The tire may be made from a rubber, polymer, or any other suitable material. The tires may provide frictional contact between the wheel 25 and 45 and a ground surface to enhance the performance of the vehicle 100.

FIG. 3 illustrates another perspective view of various components of a linear actuator system of the vehicle 100, according to aspects of the inventive concepts. As illustrated in FIG. 3, the vehicle 100 may further include a first linear actuator system 40. The first linear actuator system 40 may be coupled to the first wheel carriage 20, and adapted to longitudinally displace the first wheel carriage 20, including wheel 25, relative to the chassis 15.

The vehicle 100 may further include a second linear actuator system 65, the structure and function of which is similar to that of the first linear actuator system 40. That is, the second linear actuator system 65 may be coupled to the second wheel carriage 50 at a side opposite to the first linear actuator system 40. For example, the first linear actuator system 40 may be positioned at a left side of the vehicle 100 whilst the second linear actuator system 65 may be positioned at a right side of the vehicle 100, or vice versa. The second linear actuator system 65 may similarly be configured to longitudinally displace the second wheel carriage 50 relative to the chassis 15.

An axle 70 couples the first linear actuator system 40 to the second linear actuator system 65. Similar to the first and second wheels 25, 45, in the case of the first and second actuator systems, where described using the term "second", each of the "second" elements connects, and functions, in substantially the same manner as the termed "first" element.

In some implementations, a third motor 75 may be coupled to at least one of the first and second linear actuator systems 40 and 65 to drive the first and second linear actuator systems 40 and 65. In some implementations, each of the first and second linear actuator systems 40 and 65 may include first and second pulleys 87 and 89. The first and second linear actuator systems 40 and 65 may each further include at least one rail coupled to the chassis 15 along the longitudinal direction thereof. In some implementations, the at least one rail includes upper and lower rails 82 and 84, each coupled to the chassis 15. Each of the upper and lower rails 82 and 84 includes longitudinal slots extending therethrough, where the respective first and second wheel carriages 20 and 50 are translated through rotation of the first and second pulleys 87 and 89. The first and second wheel carriages 20 and 50 may each include one or more edge wheels coupled into the rails to facilitate movement of the wheel carriages 20 and 50 back and forth along the rails with reduced friction. In some other implementations, the first and second linear actuator systems include only one rail on each side of the chassis.

The first and second linear actuator systems 40 and 65 each further include respective belts 81 and 85 disposed along outer circumferences of the first and second pulleys 87 and 89. In some aspects, the belts 81 and 85 couple the first and second pulleys 87 and 89 to each other. The belts 81 and 85 are configured to transmit power from the third motor 75 to longitudinally displace the respective first and second wheel carriages 20 and 50 relative to the chassis 15.

In accordance with some implementations, the belts 81 and 85 may be removably attached to the outer circumference of the each of the pulleys 87 and 89, such that a rotation of pulleys 87 and 89 caused by rotational energy delivered from the third motor results in motion of the belt. The belts 81 and 85 may be formed of a metal, metal alloy, ceramic, polymer, rubber, composite material or any other suitable material. In some implementations, a chains may be used instead of the belts 81 and 85, and a cogwheels may be used instead of the pulleys 87 and 89. The first and second wheel carriages 20 and 50 are each coupled to a respective belt 81, 85 such that motion of the belts 81, 85 causes a corresponding motion of each of the first and second wheel carriages 20 and 50 relative to the chassis 15, in the longitudinal direction. As will be described below in more detail, motion of the first and second wheel carriages 20 and 50 causes the respective wheel assemblies, including the motors 30 and 55, to translate back and forth in the longitudinal direction relative to the rest of the vehicle 100. The effect of this is to translate the chassis 15 (the body) in the opposite direction to which the wheel carriages 20 and 50 with their respective wheels 25 and 45 are translated.

In operation, the first and second pulleys 87 and 89 are driven by a drive pulley system 77 which is connected directly to the third motor 75 via a drive belt 73. Rotational energy of the motor 75 is transferred from a drive pulley 79 to a drive pulley 86 of the drive pulley system 77 through the belt 73 of the drive pulley system 77. The drive pulley 86 of the drive pulley system 77 then transfers rotational energy from the belt 73 to each of the pulleys 87 and 89 of the first and second linear actuator systems 40 and 65.

FIG. 4 is a side view illustrating the linear actuator system and various components of a wheel assembly including a hub motor according to an implementation of the present disclosure. As illustrated in FIG. 4, the vehicle 100 may further include the first motor 30 integrated into the first wheel 25, and coupled to the first wheel carriage 20. The motor 30 may be coupled to the first wheel carriage 20 through a first shaft 35, and configured to provide drive energy to the first wheel 25. The motor 30 is powered by receiving electrical energy from a battery 90 (shown in FIG. 3), or fuel cell. The battery 90 may be positioned centrally, on a bottom surface of the chassis 15. In some embodiments, the motor 30 is a hub motor which is mounted directly in the center of the first wheel 25. To this effect, the motor 30 is configured with a stator 52 including a series of stationary coils disposed thereon. The stator can couple directly to the first wheel carriage 20, through which electric current is provided to the coils. The motor 30 may further include a rotor 54 which is integrated into the first wheel 25. The rotor 54 may be configured to include a series of magnets, and is rotationally mounted about the stator 52 so as to rotate around the stator 52 as applied current from the battery 90 generates an electromagnetic field. The first wheel 25, being integrally attached to the spinning rotor 54, rotates along with the spinning rotor 54.

The vehicle 100 may further include a second motor 55 integrated into the second wheel 45, and coupled to the second wheel carriage 50, as best shown in FIG. 3. Similar to the first motor 30, the second motor 55 may be attached to the second wheel carriage 50 through a second shaft 60, and configured to provide drive energy to the second wheel 45. The second motor 55 is also powered by receiving electrical energy from the battery 90 or fuel-cell. As discussed above with respect to the first motor 30, the second motor 55 may similarly be a hub motor which is mounted directly in the center of the second wheel 45. To this effect, the second motor 55 may similarly be configured with a stator 52 and a spinning rotor 54 which are structured and which function similar to the stator 52 and rotor 54 of the first motor 30. Similar to the first and second wheels, in the case of the first and second motors, where described using the term "second," each of the "second" elements connects, and functions, in substantially the same manner as the termed "first" element.

In some implementations, the hub motors 30 and 55 are independent from one another and may be commanded via unique channels of one or more motor controllers 94 contained in an autonomy and navigation computer 99. The vehicle 100 receives commands from the autonomy and navigation computer 99 and translates those commands into forward motion of the wheels 25 and 45 via the respective hub motors 30 and 55. The independence of the motors 30 and 55 allows a variety of turning modes. For example, the vehicle 100 may turn in place by running the motors 30 and 55 in at different speeds or in different directions. Alternatively, the vehicle 100 may turn sharp corners by keeping one motor off while the other is active, for a turning radius equivalent to the width of the wheel track. In some aspects, the vehicle 100 may make tight to broad turns by commanding the one of the two wheels, which paves the outer trajectory of the turn, at a faster rate than the wheel paving the inner trajectory. This maneuverability can be coupled to a pitch controller 98 to provide stable operation, as described in further detail below.

Figure 5A:
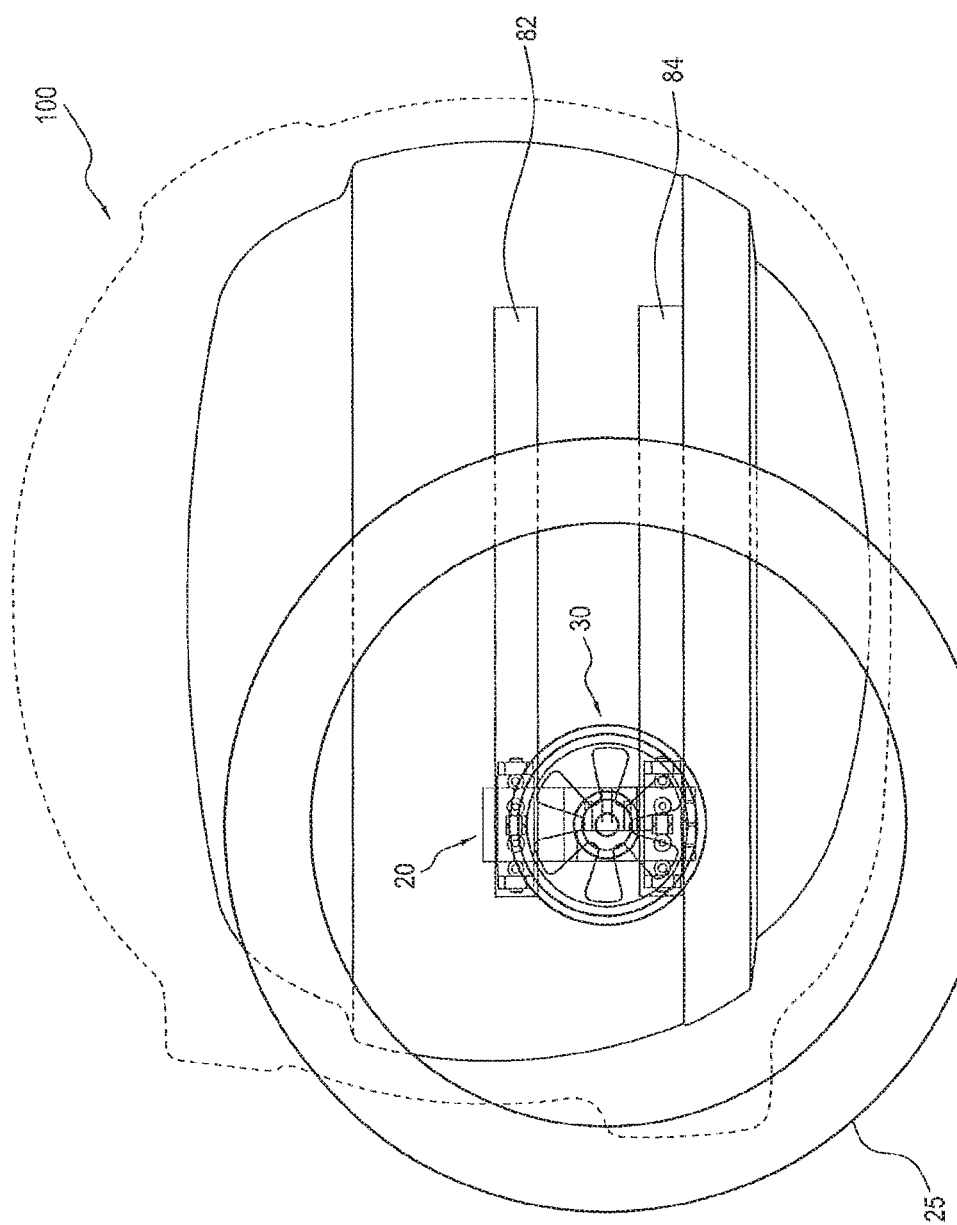
FIG. 5A is a side view illustrating a maximum rearward position of the wheel and carriage relative to the chassis of the vehicle, according to aspects of the inventive concepts.
Figure 5B:
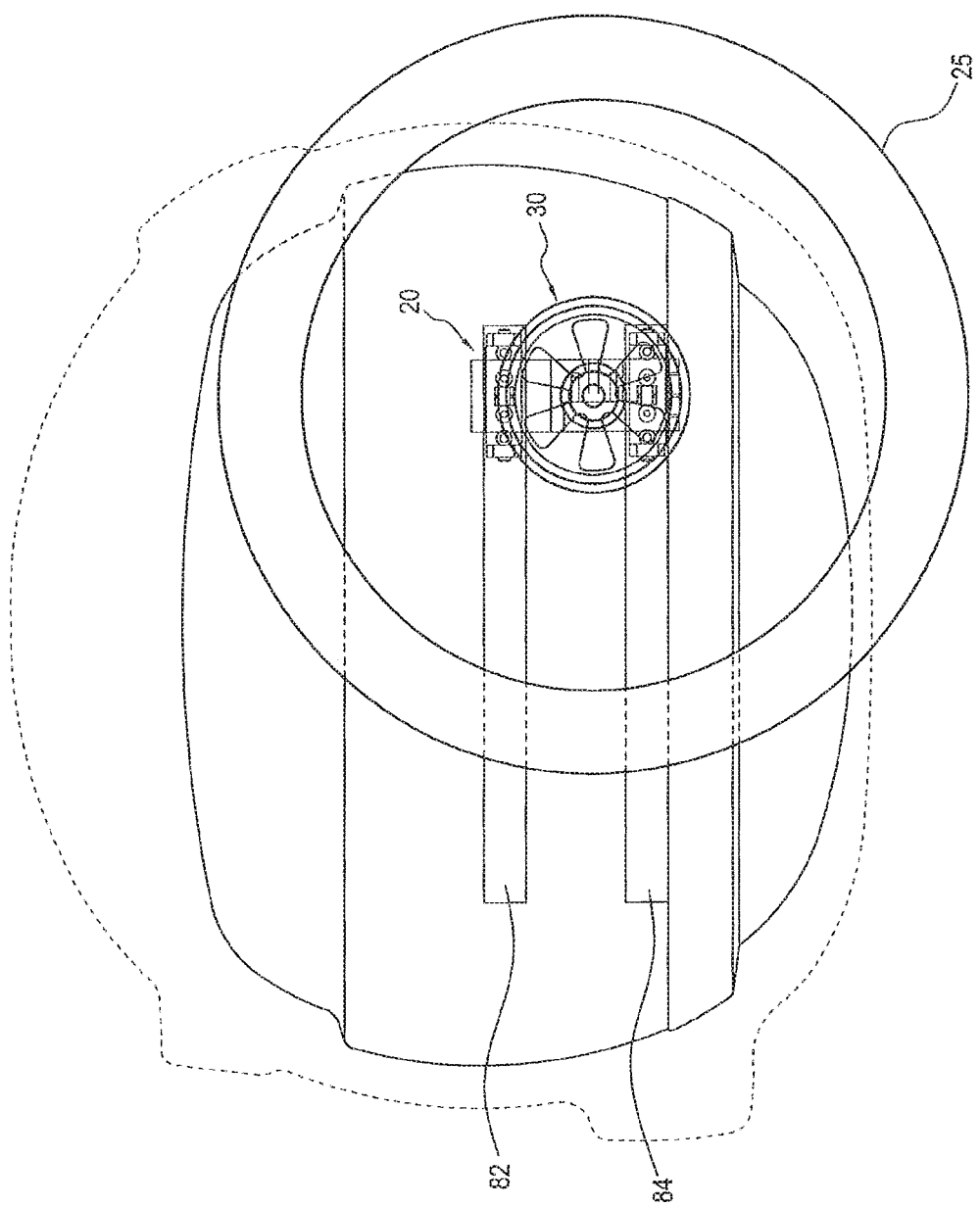
FIG. 5B is a view illustrating a maximum forward position of the wheel and carriage relative to the chassis of the vehicle, according to aspects of the inventive concepts.

FIG. 5A is a view illustrating a maximum rearward position of the wheel and carriage relative to the chassis of the vehicle, and FIG. 5B is a view illustrating a maximum forward position of the wheel and carriage relative to the chassis of the vehicle according to an implementation of the present disclosure. In accordance with some implementations, each of the linear actuator systems 40 and 65 allow the respective wheel assemblies including the hub motors 30 and 55 to translate back and forth in the longitudinal direction relative to the rest of the vehicle 100. The effect of this is to translate the chassis 15 (and the body 110) in the opposite direction to which the wheel carriages 20 and 50 with their respective wheels 25 and 45 are translated. In some aspects, each of the first and second linear actuator systems displace the respective first and second wheel carriages relative to the chassis at speeds of up to 300 mm/sec. Thus, the present disclosure provides the advantage of having available the weight of the entire chassis 15 of the vehicle 100 to act as a counterweight to balance and dynamically stabilize the vehicle 100 and maintain the vertical orientation of the laterally mounted vehicle 100.

Figures 6A, 6B:
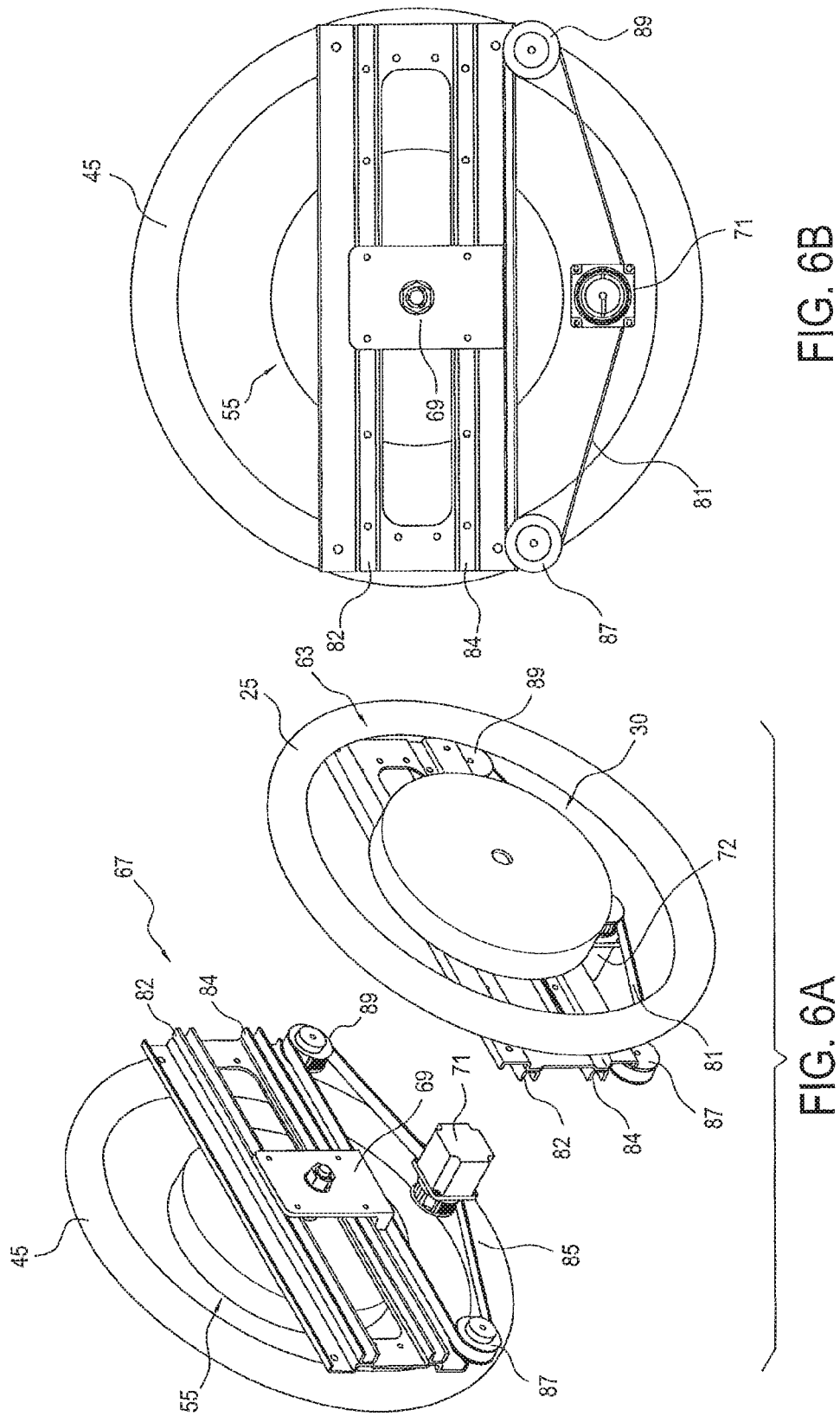
FIG. 6A illustrates a perspective view of various components of a linear actuator system of the vehicle, according to aspects of the inventive concepts.
FIG. 6B illustrates a side view of the various components of a linear actuator system of the vehicle, according to aspects of the inventive concepts.

FIG. 6A illustrates an upper perspective view of various components of a linear actuator system of the vehicle according to a second embodiment of the present disclosure. FIG. 6B illustrates a side view of the various components of a linear actuator system of the vehicle according to the second implementation of the present disclosure. As illustrated in FIG. 6A, the vehicle 100 may include first and second linear actuator systems 63 and 67, in place of first and second linear actuator systems 40 and 65. The first and second linear actuator systems 63 and 67 include a third motor 72 instead of the third motor 75. In some implementations, the third motor 72 may be coupled at a first end to at least one of the first and second linear actuator systems 63 and 67 to drive the first and second linear actuator systems 63 and 67. The third motor 72 may be mounted on a second end thereof to the chassis 15. Similar to the configuration of the first and second linear actuator systems 40 and 65, each of the first and second linear actuator systems 63 and 67 may include first and second pulleys 87 and 89, and upper and lower rails 82 and 84, each coupled to the chassis 15. The third motor 72 is configured to be mounted to the chassis 15 at a position between the first and second pulleys 87 and 89. Each of the upper and lower rails 82 and 84 include longitudinal slots extending therethrough, along which the respective first wheel carriage (not shown) and second wheel carriage 69 are translated through rotation of the first and second pulleys 87 and 89. The first and second linear actuator systems 63 and 67 may each further include respective belts 81 and 85 disposed along outer circumferences of the first and second pulleys 87 and 89.

In some aspects, the belts 81 and 85 couple the first and second pulleys 87 and 89 to each other. An axle similar to the axle 70 may couple the first pulleys 87 of the first and second linear actuator systems 63 and 67 to each other, so that rotational energy of the third motor 72 may be transmitted to both the first pulleys 87 of the first and second linear actuator systems 63 and 67. The belts 81 and 85 are configured to transmit power from the third motor 72 to longitudinally displace the respective first wheel carriage (not shown) and second wheel carriage 69 relative to the chassis 15. In some implementations, the second linear actuator system 67 may include a separate fourth motor 71 to drive the second linear actuator system 67 independently of the first linear actuator system 63. The fourth motor 71 may function similarly to the any of the aforementioned third motors 72 and 75, and may be coupled to an opposite side of the chassis 15 to that of the third motor 72. In these implementations, the belt 81 is configured to transmit power from the third motor 72 to longitudinally displace the first wheel carriage (not shown in FIG. 6A) relative to the chassis 15. The belt 85 is configured to transmit power from the fourth motor 71 to longitudinally displace the second wheel carriage 69 relative to the chassis 15.

In accordance with some implementations, the belts 81 and 85 may be removably attached to the outer circumference of the each of the pulleys 87 and 89. A rotation of pulleys 87 and 89 caused by rotational energy delivered from the third and/or fourth motors 72 and/or 71 results in motion of the belts 81 and/or 85. In some implementations, the third and fourth motors 72 and 71 may be synchronized to provide synchronized motion of the first and second linear actuator systems 63 and 67.

As will be described above with respect to the FIG. 3, motion of the first wheel carriage (not shown) and the second wheel carriage 69 causes the respective wheel assemblies including the motors 30 and 55 to translate back and forth in the longitudinal direction relative to the rest of the vehicle 100. The effect of this is to translate the chassis 15 (and body 110) in the opposite direction to which the first wheel carriage (not shown) and the second wheel carriage 69 with their respective wheels 25 and 45 are translated. In the case of the first and second carriages, where described using the term "second," each of these "second" elements connects, and functions, in substantially the same manner as the termed "first" element.

FIG. 7A illustrates a perspective view of various components of a linear actuator system of the vehicle according to a third embodiment of the present disclosure. FIG. 7B illustrates a side view of the various components of a linear actuator system of the vehicle according to the third implementation of the present disclosure.

As illustrated in FIG. 7A, the vehicle 100 may include first and second linear actuators 88 and 91, in place of first and second linear actuator systems 40 and 65. The vehicle 100 may include a third motor 76 instead of the third motor 75. In some implementations, the third motor 76 may be coupled at a first end to at least one of the first and second linear actuator systems 88 and 91 to drive at least one the first and second linear actuator systems 88 and 91. The third motor 76 may be mounted at a second end thereof to the chassis 15. Similar to the configuration of the first and second linear actuator systems 40 and 65, each of the first and second linear actuator systems 88 and 91 may include first and second pulleys 87 and 89, and upper and lower rails 82 and 84, each coupled to the chassis 15. The third motor 76 is configured to be mounted to the chassis 15 and directly connected to at least one of the second pulleys 89. Each of the upper and lower rails 82 and 84 include longitudinal slots extending therethrough, along which the respective first wheel carriage (not shown) and second wheel carriage 69 are translated through rotation of the first and second pulleys 87 and 89. The first and second linear actuator systems 88 and 91 may each further include respective belts 81 and 85 disposed along outer circumferences of the first and second pulleys 87 and 89.

In some aspects, the belts 81 and 85 couple the first and second pulleys 87 and 89 to each other. An axle similar to the axle 70 may couple the first pulleys 87 of the first and second linear actuator systems 88 and 91 to each other, so that rotational energy of the third motor 76 may be transmitted to rotate both the second pulleys 89 of the first and second linear actuator systems 88 and 91. The belts 81 and/or 85 are configured to transmit power from the third motor 76 to longitudinally displace the respective first wheel carriage (not shown) and/or second wheel carriage 69 relative to the chassis 15. In some implementations, the first linear actuator system 88 may include a separate fourth motor (not shown) to drive the first linear actuator system 88 independently of the second linear actuator system 91. The fourth motor (not shown) may function similarly to the any of the aforementioned third motors 75 and 76. In these implementations, the belt 85 is configured to transmit power from the third motor 76 to longitudinally displace the second wheel carriage 69 relative to the chassis 15. The belt 81 is configured to transmit power from the fourth motor (not shown) to longitudinally displace the first wheel (not shown) relative to the chassis 15.

In accordance with some implementations, the belts 81 and 85 may be removably attached to the outer circumference of the each of the pulleys 87 and 89, such that a rotation of pulleys 87 and 89 caused by rotational energy delivered from the third and/or fourth motors results in motion of the belts 81 and/or 85. In some implementations, the third and fourth motors may be synchronized to provide synchronized motion of the first and second linear actuator systems 88 and 91.

As will be described above with respect to the FIG. 3, motion of the first wheel carriage (not shown) and the second wheel carriage 69 causes the respective wheel assemblies including the motors 30 and 55 to translate back and forth in the longitudinal direction relative to the rest of the vehicle 100. The effect of this is to translate the chassis 15 (the body) in the opposite direction to which the first wheel carriage (not shown) and the second wheel carriage 69 with their respective wheels 25 and 45 are translated. In the case of the first and second carriages, where described using the term "second," each of these "second" elements connects, and functions, in substantially the same manner as the termed "first" element.

In accordance with some other implementations, the first and second linear actuator systems 40, 65, may each be selected from the group consisting of a ball screw, a roller screw, a voice coil, a rack and pinion, a hydraulic cylinder, and a pneumatic cylinder.

Referring back to FIGS. 3-5B, during normal operation, the vehicle 100 experiences pitch moments around the lateral axis. These pitch moments are either gravity induced due to the vehicle 100 being not precisely balanced, or dynamically-induced from acceleration or braking. In the case of balancing, the laterally-mounted vehicle 100 has a very short static stability margin, which is the longitudinal direction of the vehicle 100, over which the center of gravity can move without causing the vehicle 100 to pitch forward or backward in the longitudinal direction. The length of the stability margin is equivalent to the length of the contact patch of the tires off the wheels 25 and 45. In order to avoid precise positioning of the center of gravity of the chassis 15 of the vehicle 100, the pitch of the chassis 15 is corrected using at least one of the first and second linear actuator systems 40 and 65. Each of the linear actuator systems 40 and 65 adjusts the center of gravity of the chassis 15 automatically upon sensing an imbalance of the vehicle 100. This provides the advantage of allowing a variety of items with flexible weight distributions to be located within the cargo volume 16.

In accordance with some implementations, controlled adjustments of the linear actuator systems 40 and 65 allow the vehicle 100 to automatically maintain a near-zero pitch angle. Pitch angle of the chassis 15 or vehicle 100 relative to the horizontal is continually sensed using a pitch sensor 96. As used herein, horizontal refers to a plane which is normal or perpendicular to the gravitational pull of the earth. In some aspects, the pitch sensor 96 may be either an inclinometer or an inertial measurement unit positioned on the chassis 15. The economy and navigation computer 99 may then use the sensed data to provide a correcting torque around the center of rotation of the chassis 15 or the vehicle 100, in the plane of the wheels 25 and 45, to maintain the pitch angle of the chassis 15 to be within plus or minus [2] degrees of the horizontal to allow stable operation of the vehicle 100. The effect of this is to maintain the pitch of the chassis 15 or vehicle 100 at a near zero pitch angle. The correcting torque is thus generated by the motion of the chassis 15 back and forth relative to the carriages 20 and 50 and respective wheels 25 and 45. For a given mass of the vehicle 100 (including any payload in the cargo volume 16), an increase in the offset from the center of rotation of the vehicle 100 generates a proportional increase in torque to counter the pitch moments experienced during normal operation of the vehicle 100, around the lateral axis thereof.

The first and second linear actuator systems are continuously operated during forward and backward motion and turning motion of the vehicle 100, i.e., during normal operation thereof. In some aspects, normal operation consists of multiple starts and stop and turns, and the resulting decelerations and accelerations generate the pitching moments of the vehicle 100 that must be countered to maintain vehicle stability. In addition, the vehicle 100 must be capable of ascending and descending grades, e.g. changes in slope on level of a terrain on which the vehicle 100 travels. Such changes in terrain from level ground induce changes in the gravity vector of the vehicle 100. The present disclosure provides the advantage that due to continuous operation of the linear actuator systems 40 and 65, the vehicle 100 is capable of accommodating and riding over inclines and descents of up to, and in some implementations, more than 20°, via the continuously operating sensor and dynamic stability correction.

In some aspects, the center of gravity (Cg) of the vehicle 100 could be located either above or below the center of rotation (Cr) thereof. If the Cg is located below the Cr, then the vehicle 100 will be dynamically stable, and any disruption will cause the vehicle 100 to eventually return to its undisturbed state. However, if the Cg is located above the Cr, during regular operation including acceleration and braking, then the vehicle 100 is dynamically unstable, and a disturbance would cause the vehicle 100 to continue pitching forward or backward, depending on the disturbance. The present disclosure provides a solution to control the instability of the vehicle caused by the continuous pitching forward or backwards when the Cg is located above the Cr. The aforementioned instability issue can may be controlled according to various implementations of the present disclosure via active control achieved translation of the chassis 15 forward and backwards using the linear actuator systems 40 and 65.

In some implementations, operation of the two linear actuator systems 40 and 65 is controlled through use of at least one linear actuator controller 92. For example, motion of the two linear actuator systems 40 and 65 may be synchronized. However, the configuration of the present disclosure is not limited thereto. In other implementations, the motion of the two linear actuator systems 40 and 65 may be independent, i.e., decoupled, depending on a desired motion of the vehicle 100. Decoupled motion may be advantageous if one of the wheels 25, 45 were to go over a bump or small rise, while the other stayed on level ground. Decoupled motion may also potentially be necessary and advantageous in high-speed turning operations.

Figure 8:
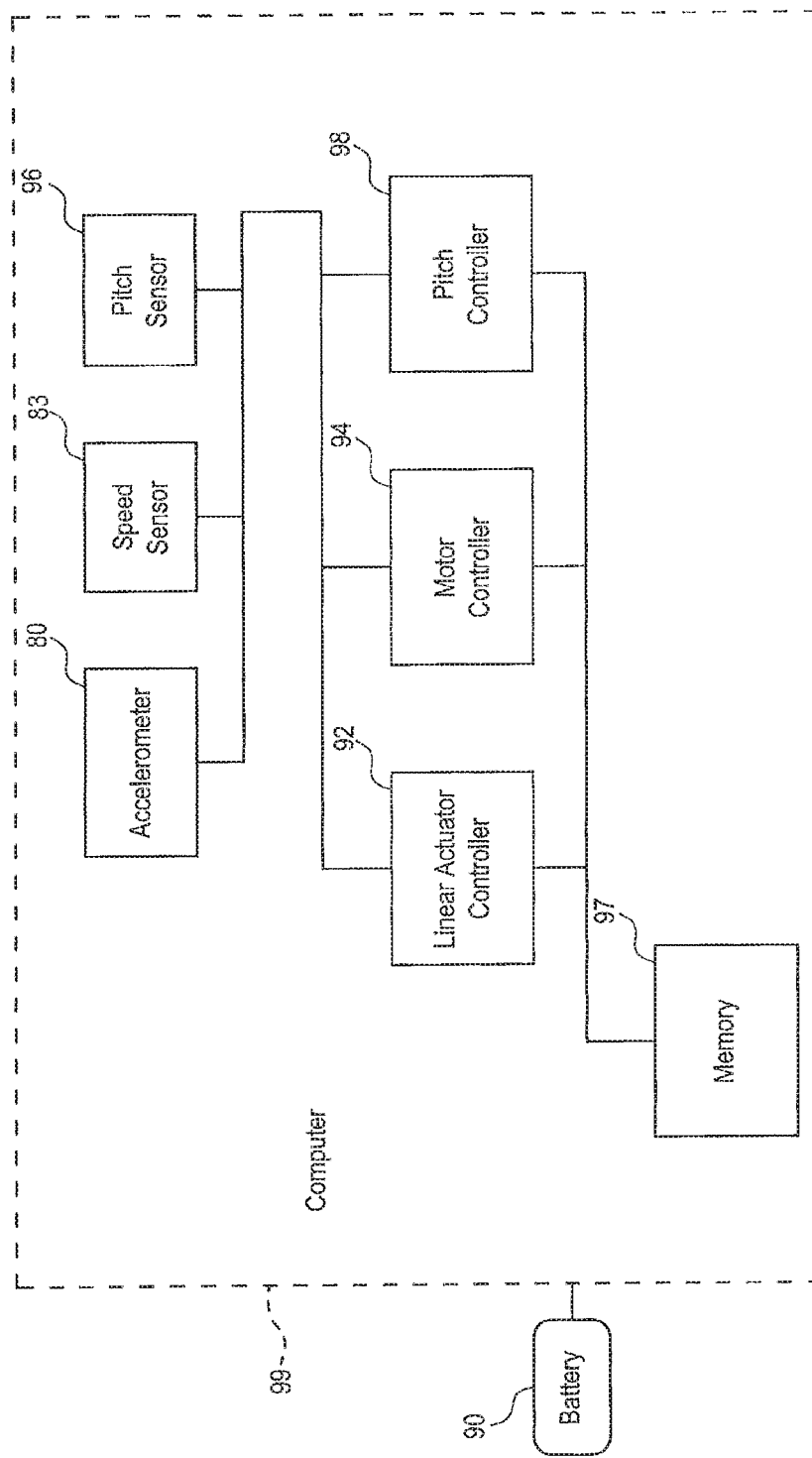
FIG. 8 is an illustration of a functional block diagram of a control system of the vehicle, according to aspects of the inventive concepts.

FIG. 8 is an illustration of an electrical block diagram of a control system of the vehicle 100 in accordance with an implementation of the present disclosure. The vehicle 100 includes one or more sensors, as best shown in FIG. 6. In some aspects, the one or more sensors may include two ultrasonic sensors for vehicle autonomy. The one or more sensors may include the pitch sensor 96 for sensing the pitch of the vehicle 100 and/or chassis 15. The one or more sensors may also include an accelerometer 80 for sensing an acceleration of the vehicle 100 and/or chassis 15. The one or more sensors may also include a speed sensor 83 for sensing a speed of the vehicle 100 and/or chassis 15. One or more of the sensors 80, 83, and 96 may be disposed and/or secured on an outer surface of the chassis 15. The computer 99 may further include a linear actuator controller 92, a motor controller 94, a pitch controller 98 and a memory 97 in electronic communication with at least one of the sensors 80, 83, and 96. In some aspects, the computer 99 may include a proportional-integral-derivative controller (PID controller) or PID-based controller which applies a control loop feedback mechanism to continuously modulate control of the orientation or pitch of the chassis 15 of the vehicle 10. In other aspects, the pitch controller may include the PID controller to continuously modulate and correct the pitch angle of the chassis 15 and maintain stability of the vehicle 10.

In accordance with some implementations of the present disclosure, a method for dynamically stabilizing a two-wheeled vehicle 100 includes measuring, by the at least one sensor 80, 83, and 96, disposed on the chassis 15, a pitch of the chassis 15 relative to the horizontal during operation of the vehicle 100, and outputting a pitch signal based thereon. The method further includes controlling, by the pitch controller 98, responsive to pitch signal output of the at least one sensor 80, 83, and 96, at least one of the first and second linear actuator systems 40 and 65 to displace at least one of the first and second wheel carriages 20 and 50 longitudinally relative to the chassis 15 to control chassis orientation relative to the horizontal in various moving and non-moving states, e.g., "sitting."

The one or more sensors 80, 83, and 96 determine and output a measurement of a state of the vehicle 100 and/or chassis 15. The determination is sent to the memory 97 and controller 92, which orders an operation of at least one of the third motor 75 which powers the first and second linear actuator systems 40 and 65. For example, the pitch sensor 96 determines a pitch of the vehicle 100 and/or chassis 15 and outputs the measured pitch to the memory 97 and controller 92, which commands an operation of the third motor 75. In this manner the vehicle 100 can determine, by controller is 92, 94, and 98 and based on sensors 80, 83, and 96 data, an orientation, acceleration or speed of the vehicle 100 and/or chassis 15. In some implementations, the sensors 80, 83, and 96 can make multiple determinations at different times or continuously to determine a change in orientation, acceleration or speed of the vehicle 100 and/or chassis 15, or rate of change in orientation, acceleration or speed of the vehicle 100.

In some embodiments, once the above determination of an orientation, acceleration or speed, or of a change (or rate of change) in the orientation, acceleration or speed, of the vehicle 100 and/or chassis 15 is made, the controller 92 and/or memory 97 control the third motor 75 to move at least one of the first and second linear actuator systems 40, 65 in response to the measured determination. In one aspect, the controller 92 and/or memory 97 control the third motor 75 to move at least one of the first and second linear actuator systems 40 and 65 to maintain a substantially constant vehicle 100 and/or chassis 15 orientation about a lateral axis of the vehicle 100 and/or chassis 15. Thus, each of the linear actuator systems 40 and 65 allow the respective wheel assemblies including the hub motors 30 and 55 to translate back and forth in the longitudinal direction relative to the rest of the vehicle 100. The effect of this is to translate the chassis 15 (and the body 110) in the opposite direction to which the wheel carriages 20 and 50 with their respective wheels 25 and 45 are translated. Thus, the present disclosure provides the advantage of having available the weight of the entire chassis 15 of the vehicle 100 to act as a counterweight to balance and dynamically stabilize the vehicle 100 and maintain the vertical orientation of the laterally mounted vehicle 100.

As described above, in accordance with some implementations, controlled adjustments of the linear actuator systems 40 and 65 allow the vehicle 100 to automatically maintain the pitch angle of the chassis 15, e.g., to be within plus or minus two degrees of the horizontal, to allow controlled and/or stable operation of the vehicle 100. The effect of this is to maintain the pitch of the chassis 15 or vehicle 100 at a near-zero pitch angle, e.g., during steady state movement or constant velocity. The pitch angle of the chassis 15 or vehicle 100 is continually sensed using the pitch sensor 96, which may be either an inclinometer or an inertial measurement unit. In some aspects, where the economy and navigation computer 99 includes a PID controller instead of the pitch controller 98, the PID controller may then use the sensed data to provide a correcting torque around the center of rotation of the chassis 15 or the vehicle 100, in the plane of the wheels 25 and 45. To this effect, the PID controller continuously calculates an error value as the difference between the desired pitch angle (i.e., near zero pitch angle) and the actual measured pitch based on the instability of the vehicle 10. The PID controller 98 then applies a correction factor based on proportional, integral, and derivative terms in order to minimize the difference in value between the desired pitch angle (e.g., near zero) and the sensed or measured pitch angle. Thus, in some implementations, a motion of the chassis 15 acting as a counterweight can be determined using a proportional-integral-derivative (PID) controller algorithm.

The correcting torque is applied to maintain the pitch angle of the chassis 15 to a near zero pitch angle to allow stable operation of the vehicle 100. The correcting torque is thus generated by the motion of the chassis 15 back and forth relative to the carriages 20 and 50 and respective wheels 25 and 45. For a given mass of the vehicle 100 (including any payload in the cargo volume 16), an increase in the offset from the center of rotation of the vehicle 100 generates a proportional increase in torque to counter the pitch moments experienced during normal operation of the vehicle 100, around the lateral axis thereof.

Figure 9:
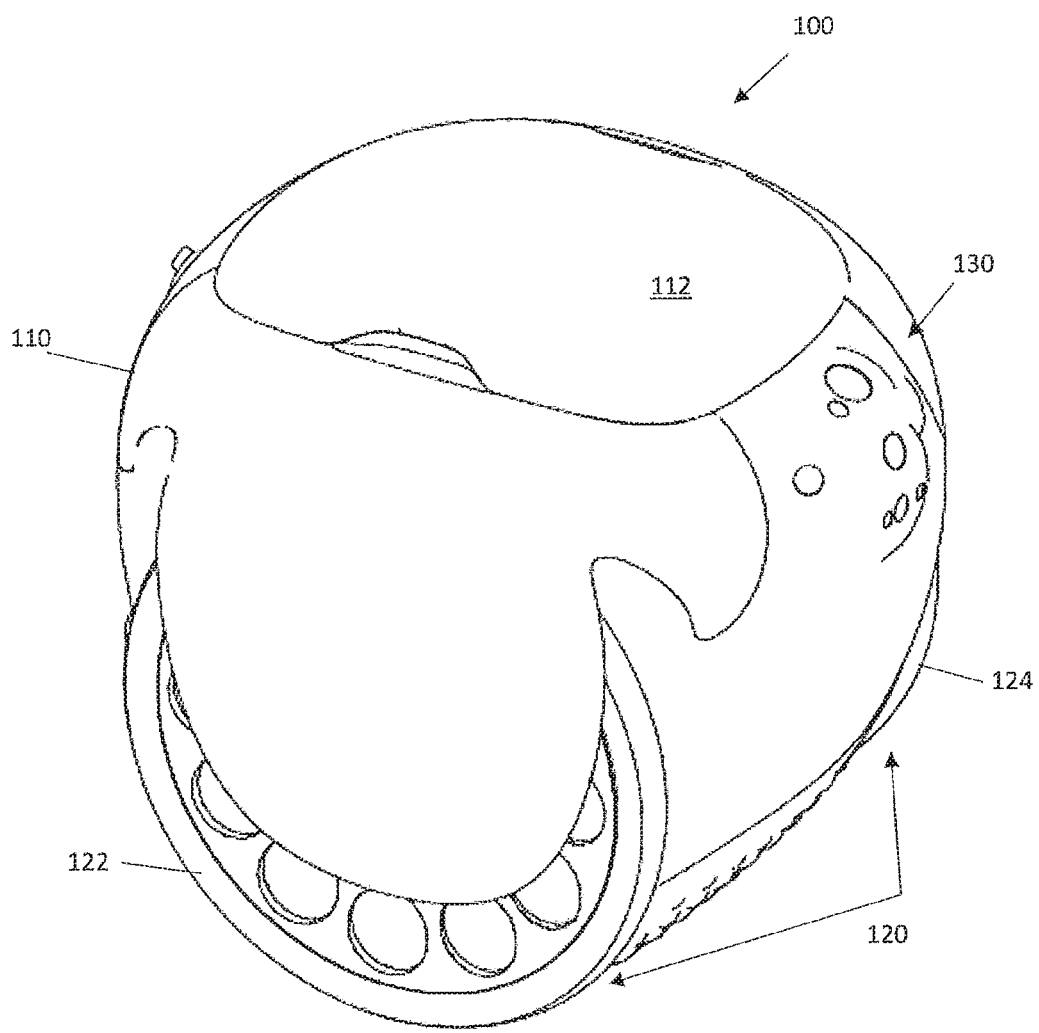
FIG. 9 is an isometric view of an embodiments of a mobile carrier, in accordance with aspects of the inventive concepts.

FIG. 9 is an isometric view of an embodiment of a vehicle in the form of a mobile carrier 100, in accordance with aspects of the inventive concepts. The mobile carrier 100 includes a body 110 and a set of wheels 120. In this embodiment, the mobile carrier is a two-wheeled carrier, having a first wheel 122 on one side of the carrier body 110 and a second wheel 124 on an opposite side of the carrier body 110. In various embodiments, the body 110 also includes a lid 112 that provides access to an internal storage compartment, payload, and/or equipment. In various embodiments, the internal storage compartment can be configured to receive a load, such that the mobile carrier 100 is configured to carry the load.

In this embodiment, the carrier 100 further includes a user interface 130. In various embodiments, the user interface 130 can include one or more input devices and/or sensors configured to enable a user to control operation and functions of the mobile carrier, enable the mobile carrier to perform or cease certain operations or functions based, at least in part, on sensor data, and/or combinations thereof. As examples, the user interface 130 can include one or more buttons, touch screens, cameras, range sensors, audio input device (e.g., microphone), audio output devices, light emitting devices, and so on, and various combinations thereof.

Figure 10:
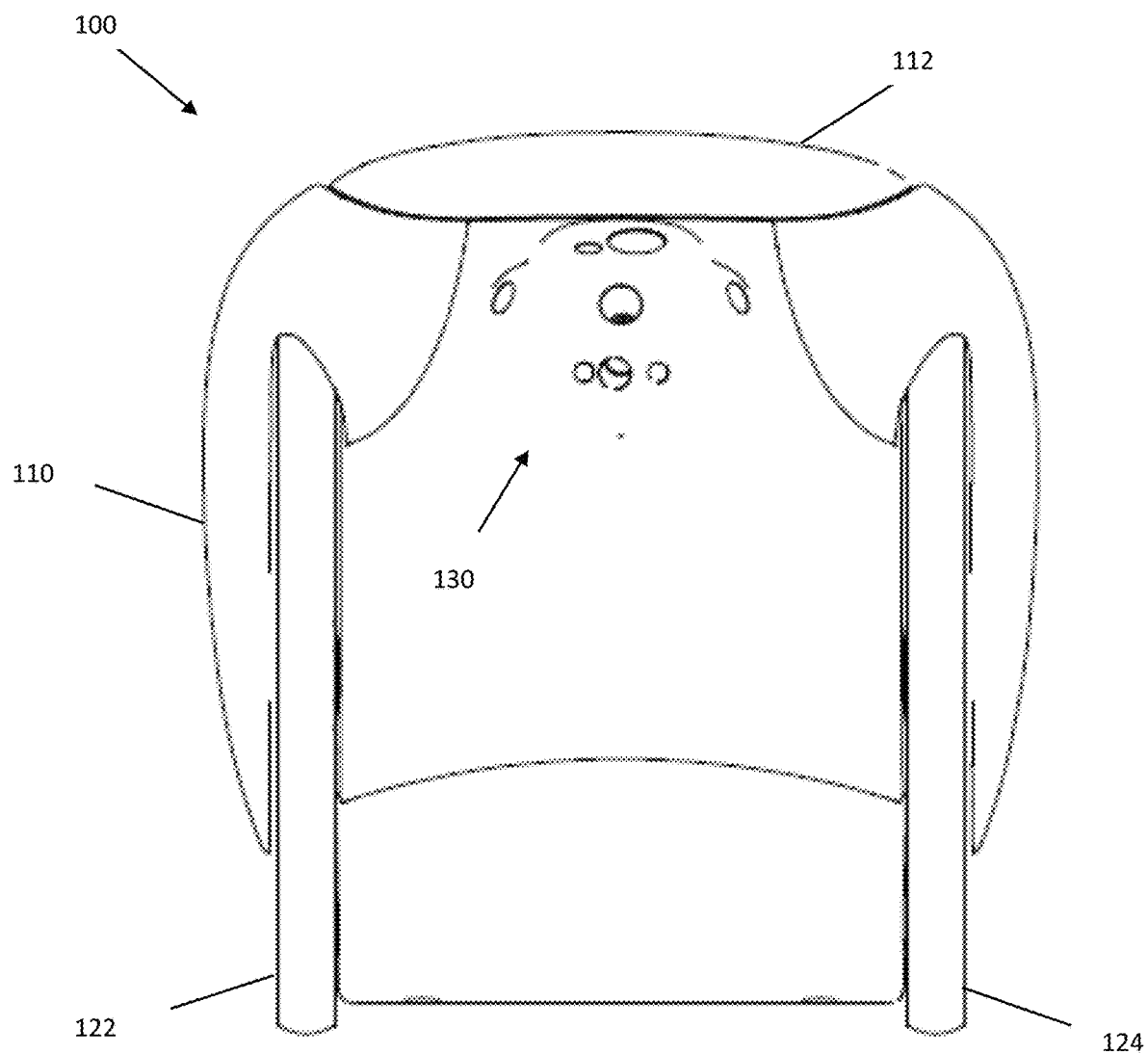
FIG. 10 is a front view of the mobile carrier of FIG. 9.
Figure 10A:
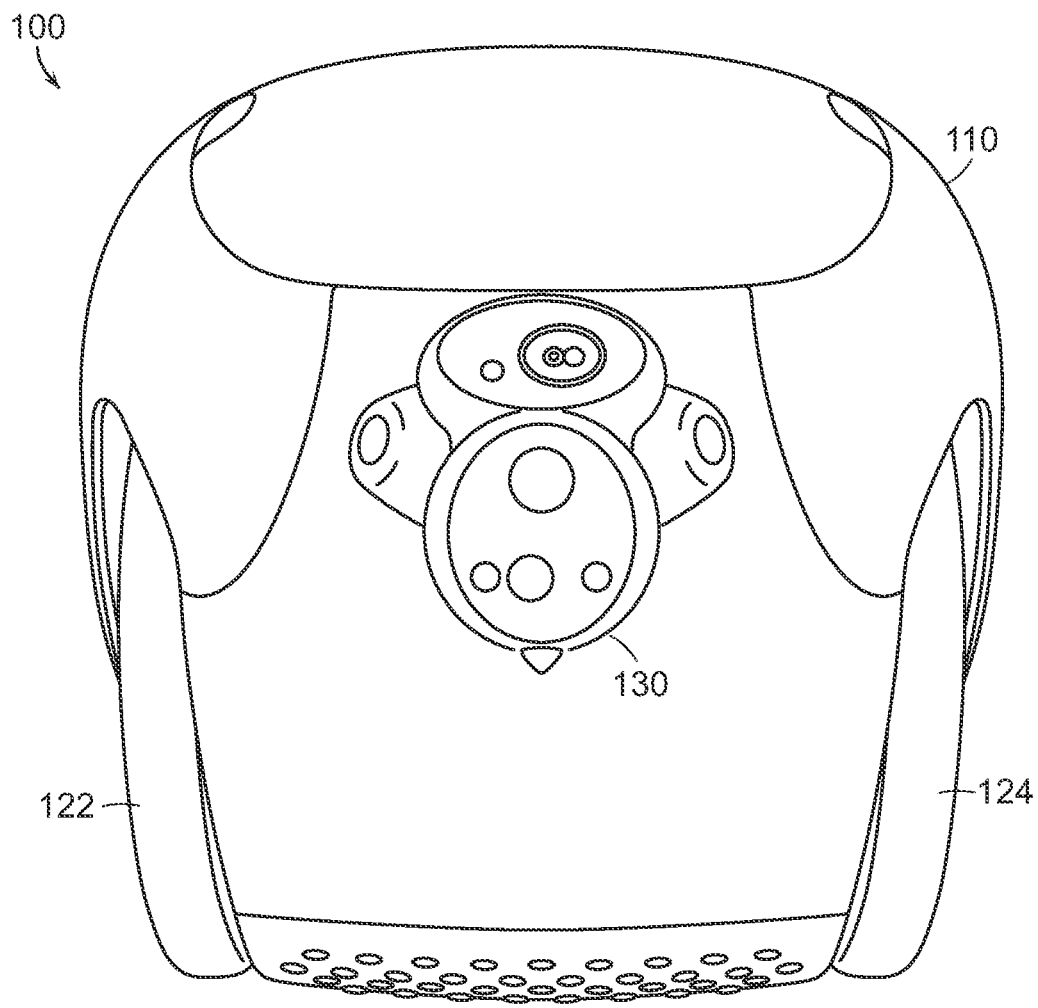
FIG. 10A is another front view of the mobile carrier of FIG. 9.

FIGS. 10 and 10A are front views of the mobile carrier 100 of FIG. 9. From FIGS. 10 and 10A, the two wheels 122, 124 are more clearly visible, as is the user interface 130.

Figure 11:
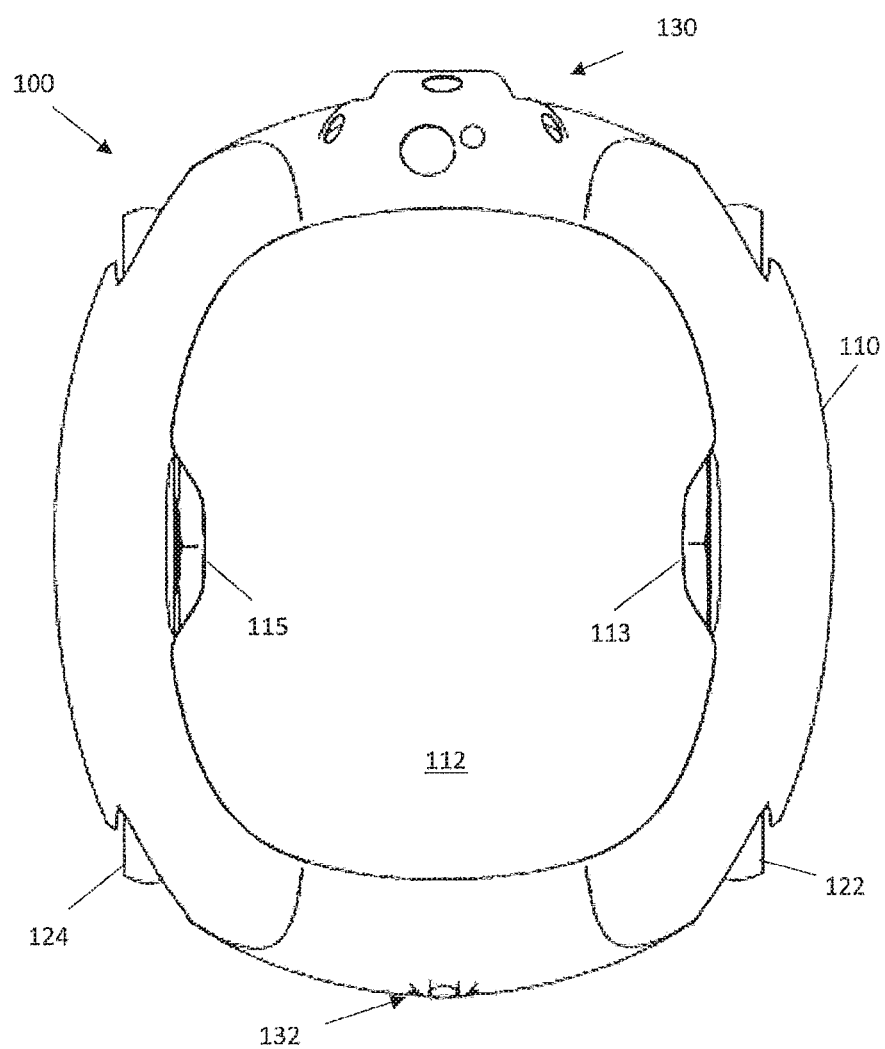
FIG. 11 is a top view of the mobile carrier of FIG. 9.

FIG. 11 is a top view of the mobile carrier 100 of FIG. 9. From this view, the wheels 122, 124 are partially visible, because portions of the body 110 wrap over and cover a view of the wheels 122, 124 from the top. The lid 112 is more visible from this viewpoint. In this embodiment, the lid 112 includes two grips 113, 115 useful for opening the lid 112. In other embodiments, different mechanisms could be provided for opening the lid 112.

Figure 12:
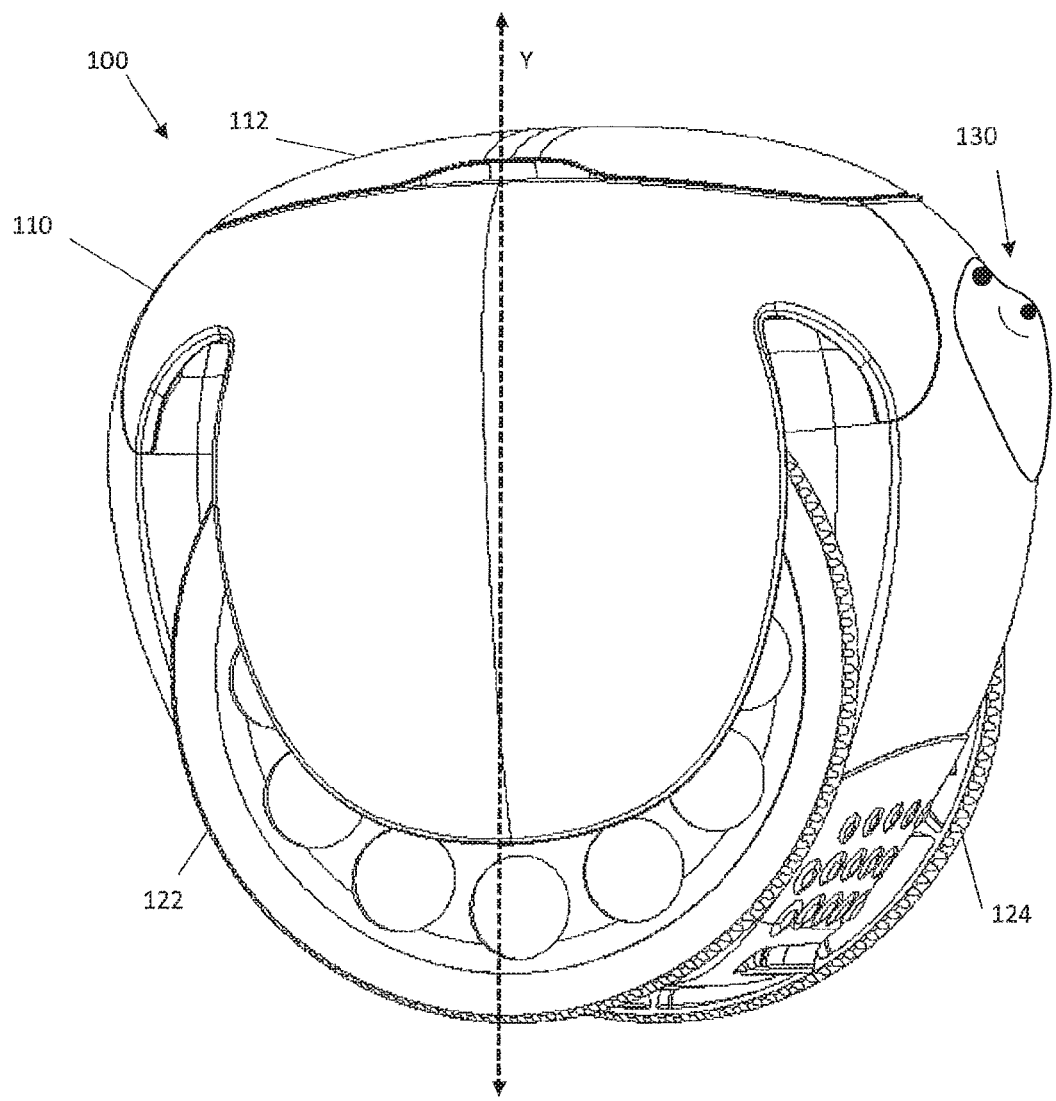
FIG. 12 is a side view of the mobile carrier of FIG. 9 with the wheels centered.

FIG. 12 is a side view of the mobile carrier 100 of FIG. 9 with the wheels 122, 124 centered. In FIG. 12, a vertical axis "Y" passes through an axis of rotation of the wheels 122, 124. In this view, wheels 122, 124 are in a neutral position, i.e., generally centered with the axis Y and a center of mass of the mobile carrier 100. In various embodiments, the neutral position can be a steady state travel position, e.g., wherein the mobile carrier 100 is not accelerating or decelerating, and/or an intermediate position achieved while shifting between rearward and forward positions of the wheels 122, 124.

In preferred embodiments, the mobile carrier 100 includes a linkage-based shifting assembly (see below) that shifts the body 110 (including its chassis) back and forth between a forward position and a rearward position relative to the wheels 122, 124. The linkage-based shifting assembly provides more control over the mobile carrier 100 during acceleration and deceleration, i.e., more torque control on the wheels 122, 124 in response to the positon of the load with respect to an axis of rotation of the wheels 122, 124. In various embodiments, the wheels 122, 124 share a common axis of rotation, but can be independently driven.

Figure 13:
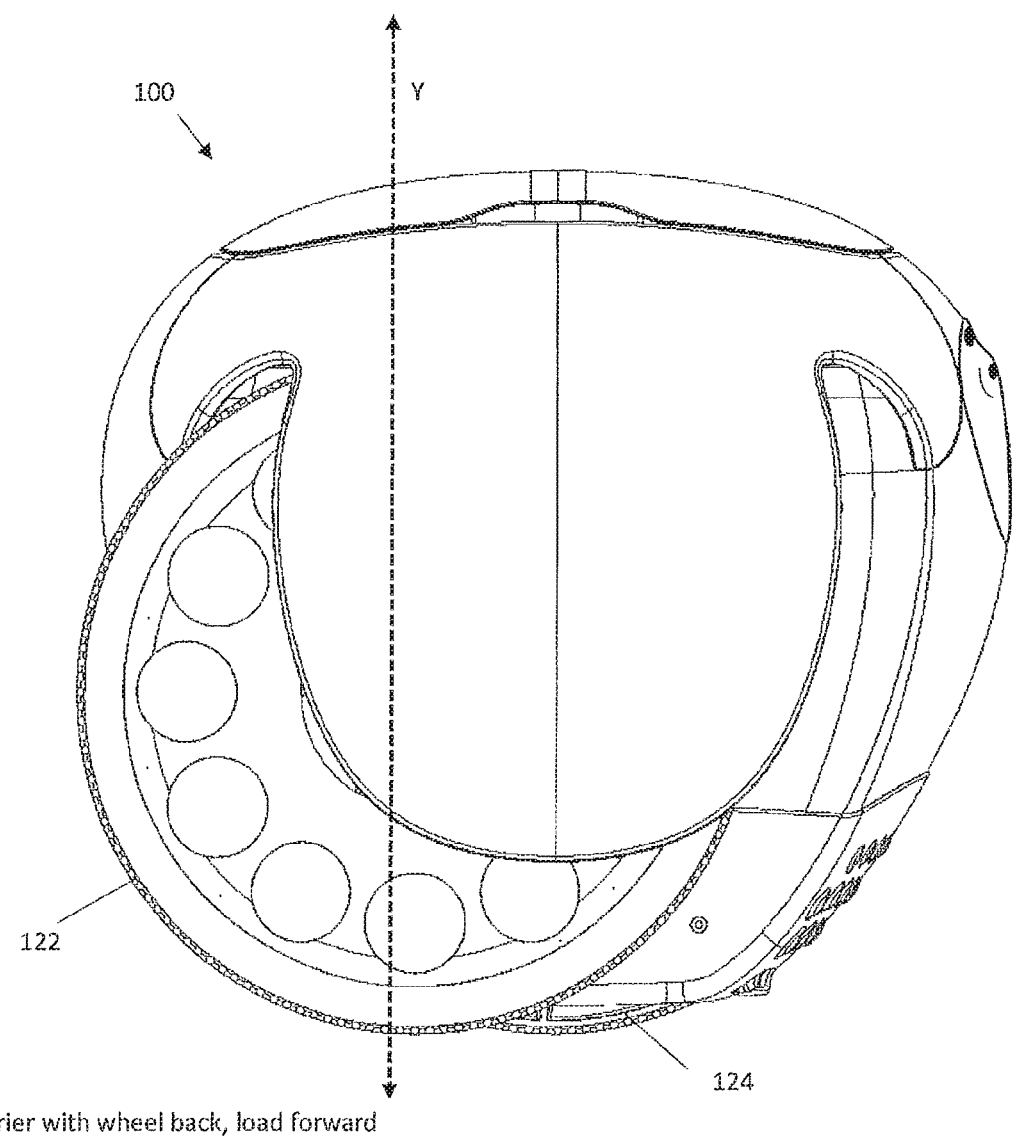
FIG. 13 a side view of the mobile carrier of FIG. 9 with the carrier with wheels rearward and load forward.

FIG. 13 a side view of the mobile carrier 100 of FIG. 9 with the wheels 122, 124 back and the center of mass (and body 110) forward. This orientation of the wheels 122, 124 can be a rest or "sitting" position of the carrier 100, e.g., where at least one portion of the body, e.g., a foot, contacts a ground surface in addition to the wheels 122, 124. The body 110 can shift slightly forward such that the foot raises off the ground surface and the body can remain shifted forward with respect to the wheels 122, 124 for acceleration of the carrier 100. During acceleration, therefore, the axis of rotation of the wheels 122, 124 is shifted behind the center of mass of the carrier body 110, which gives more control over torque in the wheels 122, 124 during acceleration. The shifting of the wheels from the neutral (or "standing") position to the rearward position is enabled and controlled by the linkage-based shifting assembly discussed herein.

Figure 14:
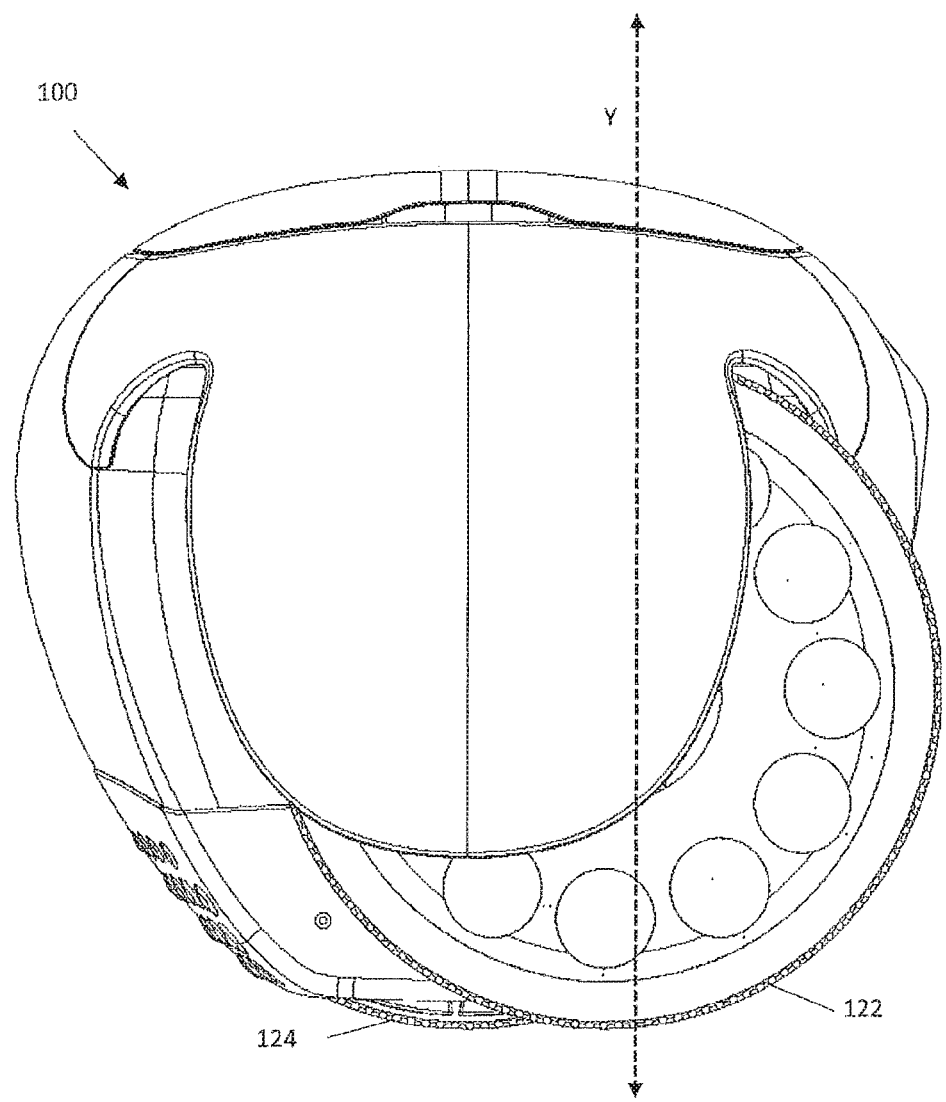
FIG. 14 a side view of the mobile carrier of FIG. 9 with the carrier with wheels forward and load rearward.

FIG. 14 a side view of the mobile carrier 100 of FIG. 9 with the wheels 122, 124 forward and load (body 110) back. This orientation of the wheels 122, 124 with respect to the body 110 (and center of mass) can be an orientation used in deceleration of the carrier 100, with the wheels 122, 124 shifted forward of the center of mass of the carrier body 110, which gives more control over torque in the wheels 122, 124 during deceleration. The shifting of the wheels 122, 124 from the rearward, through the neutral position, to the forward position is enabled and controlled by the linkage-based shifting assembly.

Figure 15:
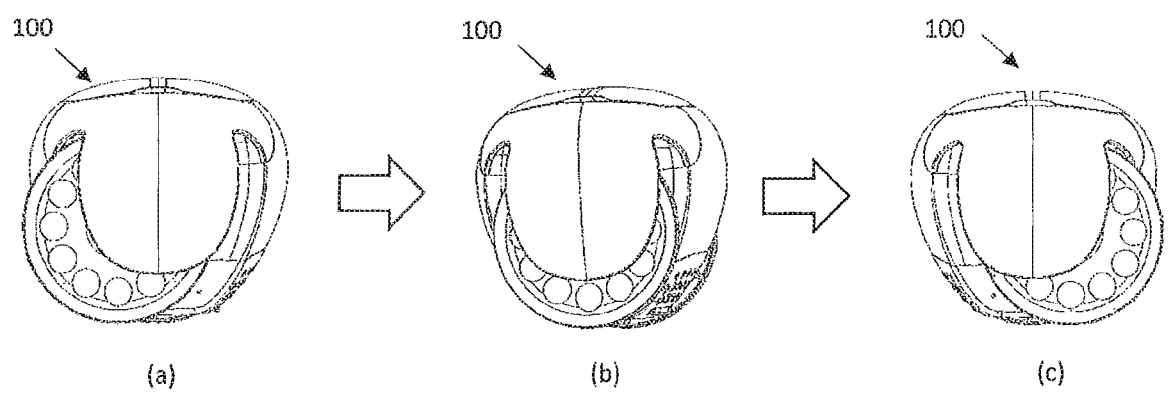
FIG. 15 a side view of the mobile carrier of FIG. 9 transitioning from a sitting position to standing and driving positions (left to right), according to aspects of the inventive concepts.

FIG. 15(a) through (c) shown side views of the mobile carrier 100 of FIG. 9 moving from sitting to standing and driving positions (left to right), with appropriate relative shifting of the wheels and body. In FIG. 15(a), the mobile carrier 100 is in the starting or sitting position, with the wheels 122, 124 rearward with respect to the body 110. This is also an acceleration position, used to transition from the sitting state to a moving state. The carrier body 110 shifts with respect to the wheels 122, 124 to transition the carrier out of the sitting position and to a standing position for acceleration. The wheels 122, 124 remain in this shifted position as the mobile carrier 100 accelerates. In FIG. 15(a), the carrier is shown in an acceleration position.

FIG. 15(b) shows the carrier 100 in a neutral traveling or transition position, which can also be a standing position. The position can be used when the carrier is traveling, e.g., at a substantially constant speed. This position could also be used in acceleration and/or deceleration, but torque control would not be as good as it would be in the positions shown in FIGS. 15(a) and 15(c). This position can also be an intermediate position between shifting the body rearward or forward with respect to the wheels 122, 124.

FIG. 15(c) shows the carrier 100 in a deceleration position, with the wheels 122, 124 shifted forward with respect to the axis Y. This position of the wheels 122, 124 is advantageous for stopping or slowing.

Figure 16:
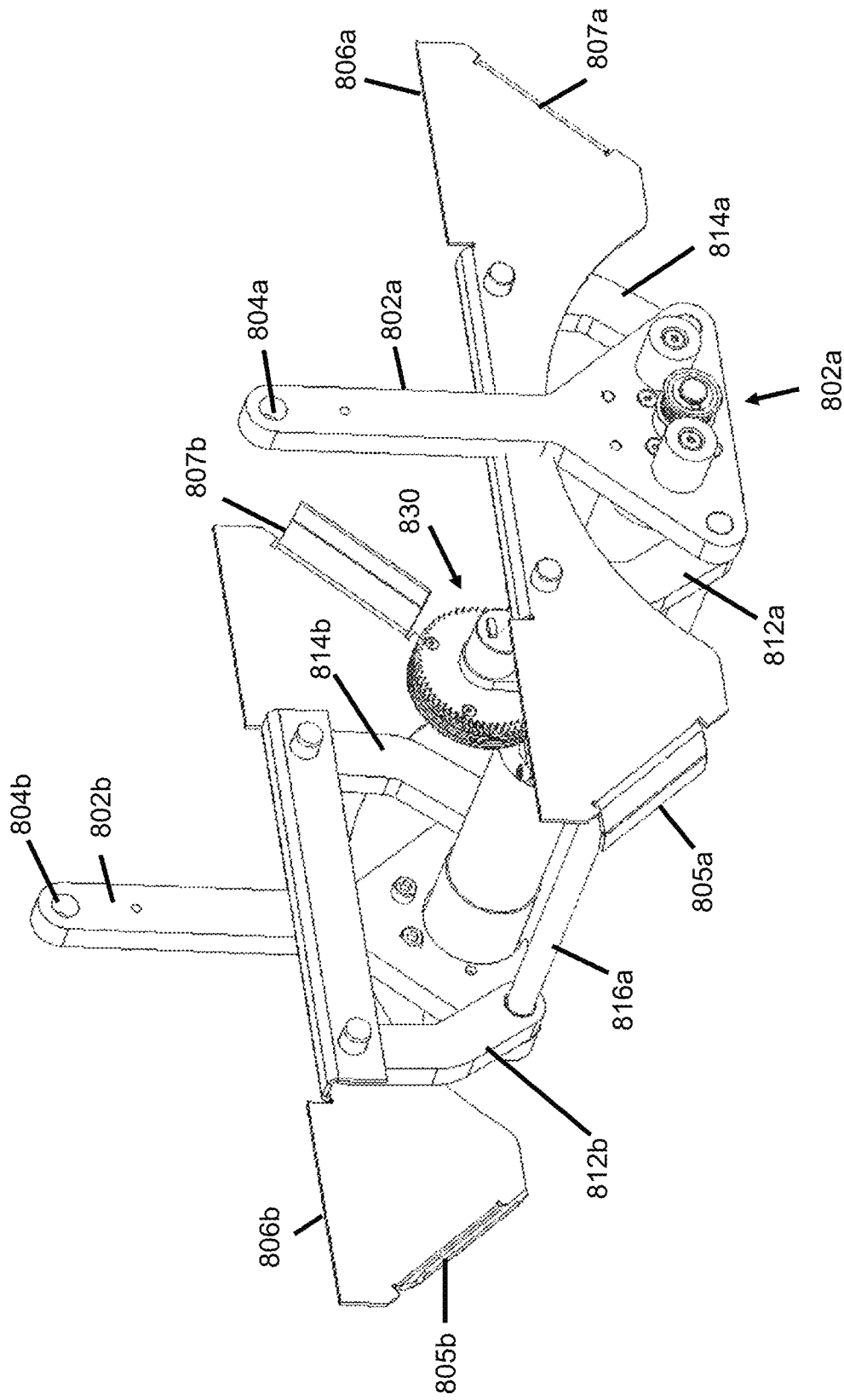
FIG. 16 an isometric view of an embodiment of a linkage-based shifting assembly that can form part of the mobile carrier of FIG. 9, according to aspects of the inventive concepts.
Figure 17:
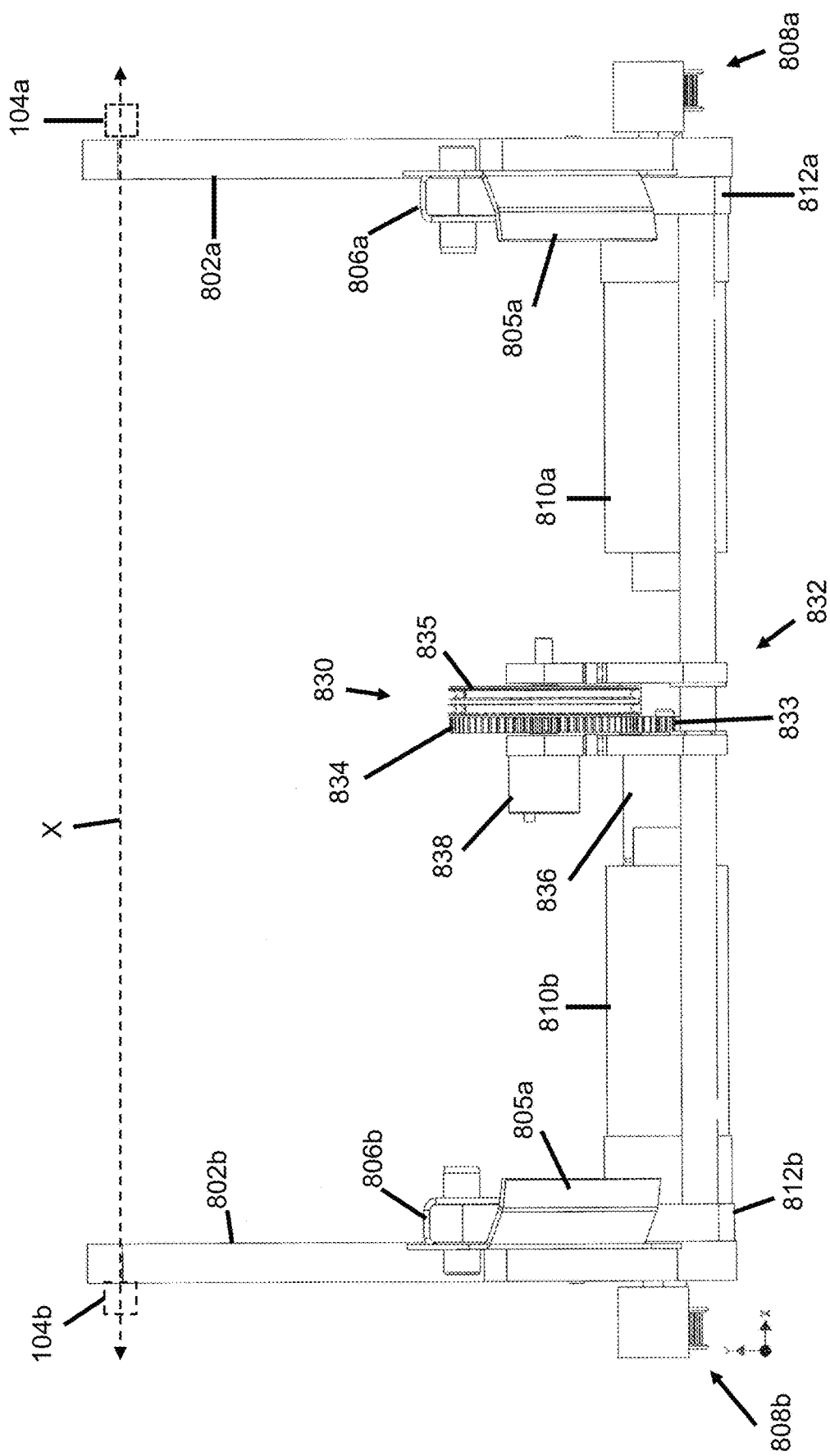
FIG. 17 a front view of the linkage-based shifting assembly of FIG. 16.
Figure 18:
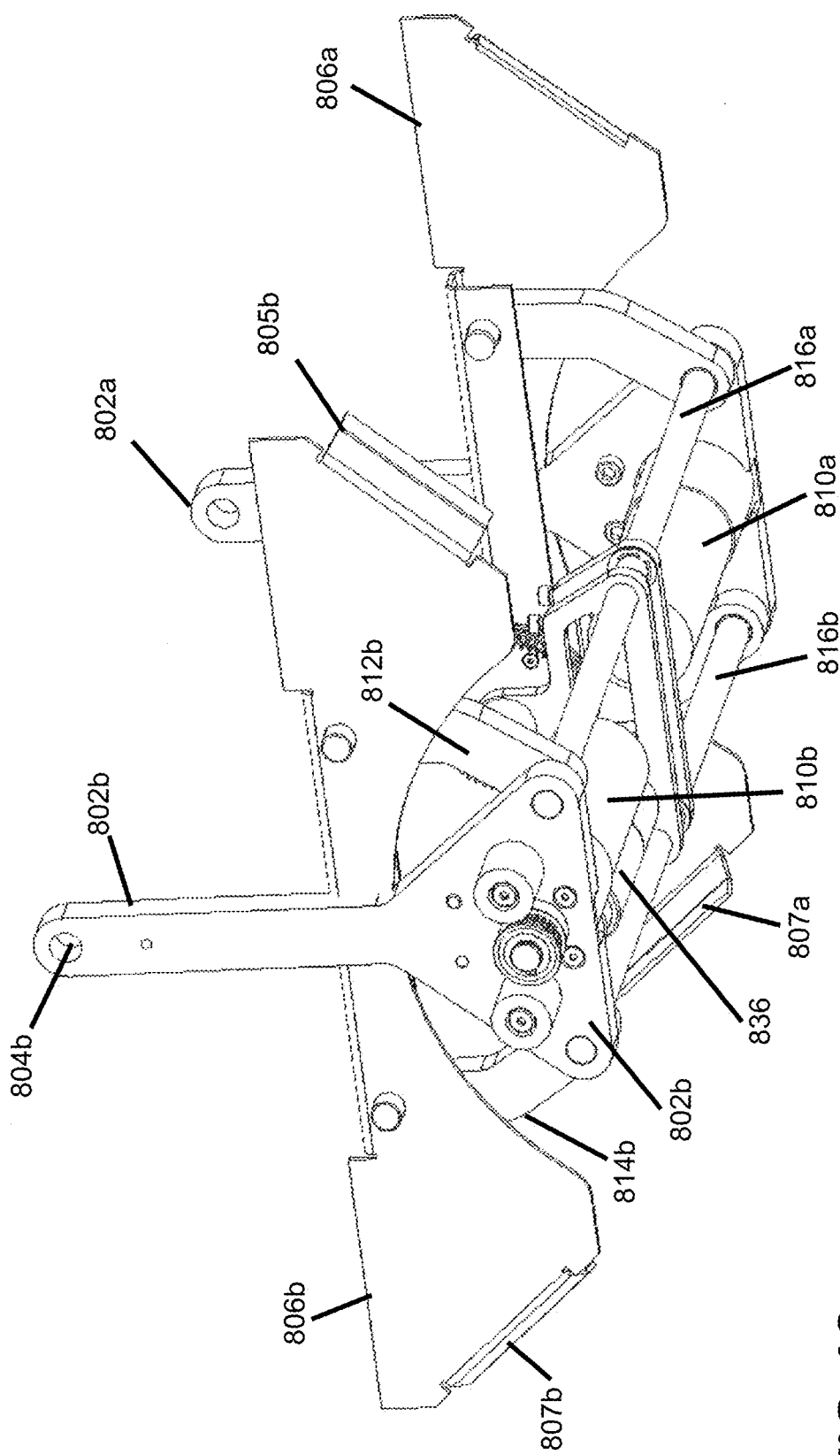
FIG. 18 a bottom isometric view of the linkage for linkage-based shifting assembly of FIG. 16.

FIG. 16 is an isometric view of an embodiment of a linkage-based shifting assembly 800 that can form part of the mobile carrier 100 of FIG. 1. FIG. 17 is a front view of the linkage-based assembly of FIG. 16. And FIG. 18 a bottom isometric view of the linkage-based shifting assembly of FIG. 16.

The assembly 800 is particularly useful for enabling and effecting shifting of the carrier body 110 with respect to two or more wheels sharing a common access of rotation, such as wheels 122, 124. The assembly 800 can be disposed within the carrier body 110 and move relative to the carrier body 110.

The assembly 800 includes a first swing arm 802a and a second swing arm 802b, disposed on opposite sides of the assembly 800. The arms 802a, 802b are configured to swing relative to a mobile carrier chassis of the carrier body 110. In various embodiments, the arms 802a, 802b are configured to simultaneously swing to move the body 110 and its chassis with respect to the center of the wheels 122, 124, which remain co-axial with the axis "X".

At a proximal end of each arm 802a, 802b, is a connection structure 804a, 804b configured to receive the wheels 122, 124. In this embodiment, the connection structure 804a takes the form of an opening configured to receive an axle of the wheel 122 and the connection structure 804b takes the form of an opening configured to receive an axle of the wheel 124. The couplings between the wheels 122, 124 and their respective arms 802a, 802b enables rotation of the wheels with respect to the arms on the axis X of rotation.

In the present embodiment, intermediate first and second support plates 806a, 806b are stationary relative to the carrier body 110, or its chassis. The support plates 806a, 806b can be orientated substantially parallel to the wheels 122, 124, such as in this embodiment. In this embodiment, each of the first and second support plates 806a, 806b includes a plurality of flanges 805a, 805b, 807a, 807b configured to secure the first and second support plates 806a, 806b to the chassis of carrier body 110.

The arms 802a, 802b are configured to swing parallel to the support plates 806a, 806b. In this embodiment, various linkage components are disposed between the support plates 806a, 806b. This arrangement is configured to provide maximum space for an internal storage compartment (not shown), payload, or equipment of the mobile carrier 110.

A first linkage arm 812a and a second linkage arm 814a extend from the first support plate 806a. The first linkage arm 812a and the second linkage arm 814a are rotatably coupled to the first support plate 806a. And a third linkage arm 812b and a fourth linkage arm 814b extend from the second support plate 806b. The third linkage arm 812b and the fourth linkage arm 814b are rotatably coupled to the second support plate 806b.

A first linkage bar 816a couples between a distal end of the first arm 802a and a distal end of the second arm 802b. The first linkage bar 816a passes through an opening at a bottom end of the first linkage arm 812a to couple to the first arm 802a and passes through an opening at a bottom end of the third linkage arm 812b to couple to the second arm 802b.

A second linkage bar 816b also couples between the distal end of the first arm 802a and the distal end of the second arm 802b. The second linkage bar 816b passes through an opening at a bottom end of the third linkage arm 814a to couple to the first arm 802a and passes through an opening at a bottom end of the fourth linkage arm 814b to couple to the second arm 802b. The first and second linkage bars 816a, 816b extend along axes that are parallel to the axis X of rotation of the wheels 122, 124.

Also at distal ends of the arms 802a, 802b are disposed left and right wheel pulleys 808a, 808b. In this embodiment, the left and right wheel pulleys 808a, 808b are disposed between the first and second linkage bars 816a, 816b. The pulleys 808a, 808b are respectively driven by drive motors 810a, 810b. In various embodiments, motor 810a is coupled to arm 802a and motor 810b is coupled to arm 802b. This configuration allows the motors 810a, 810b to stay stationary with respect to the wheels 122, 124, as each motor 810a, 810b is also attached to its swing arm 802a, 802b.

The pulleys 808a, 808b can be configured to operatively couple to their respective wheels 122, 124. The hubs of wheels 122, 124 preferably include, therefore, corresponding pulleys 104a, 104b. In various embodiments, a first belt (not shown) is operatively coupled between pulley 808a and the corresponding pulley 104a of wheel 122. Similarly, a second belt (not shown) is operatively coupled between pulley 808b and the corresponding pulley 104b of wheel 124. As such, motors 810a, 810b are configured to independently drive wheels 122, 124 via their respective pulley systems.

A shifting assembly 830 is disposed between the arms 802a, 802b and the support plates 806a, 806b. The shifting assembly 830 is configured to shift the carrier body 110 with respect to the wheels 122, 124.

The shifting assembly 830 includes a gear carriage 832 having a bottom portion through which the first and second linkage bars 816a, 816b pass. At a bottom portion of the gear carriage 832 is a first gear 833, with a second gear 834 and a coaxial capstan 835 disposed at a top portion of the gear carriage 832. In this embodiment, the gear carriage 832 comprises parallel plates between which is disposed the first and second gears 833, 834 and capstan 835.

At least one shifter motor 836 drives the first gear 833 to cause rotational movement of the first gear 833. The first gear 833 engages and drives the second gear 834 in response to the shifter motor 836 actuation. The second gear 834 is coupled to or includes the capstan 835. Rotation of the second gear 834 causes a corresponding rotation of the capstan 835.

An encoder 838 is operatively coupled to the second gear 834 and capstan 835 and measures an angle of the second gear 834. The capstan 835 winds a steel rope (not shown) that is fixed to the mobile chassis (or carrier body 110) at both ends. Rotation of the capstan 835 via rotation of the second gear 834, which is engaged and rotated by the first gear 833, provides the shifting action of the carrier body 110 with respect to the wheels 122, 124, by climbing the linkage assembly 800 with the drive motors 810a, 810b, and wheels 122, 124 from end-to-end of the chassis, wherein the support plates 806a, 806b attached to the chassis remain relatively stationary.

Therefore, in this embodiment, the shifter motor 836 couples to the first gear 834 to selectively shift the assembly 800 forward and rearward. In shifting the assembly 800, the mobile carrier body 110 are selectively shifted forward and rearward in a controlled manner with respect to the wheels 122, 124 and axis X of wheel rotation.

Figure 19:
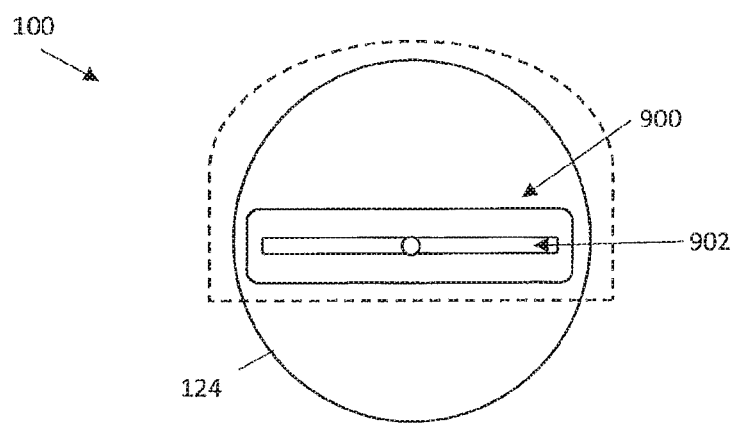
FIG. 19 a side view of another embodiment of a wheel shifting assembly, in accordance with aspects of the inventive concepts.

FIG. 19 a side view of another embodiment of a wheel shifting assembly 900, in accordance with aspects of the inventive concepts. The embodiments, of FIGS. 1-18 are specific types of wheel shifting assemblies. In various other embodiments, the shifting assembly 900 can take any form that enable shifting of the carrier body and/or chassis to shift forward and/or rearward with respect to wheels 122, 124. Such shifting can be used to shift wheels 122, 124 forward and rearward, e.g., in one or more tracks 902, whether straight or curved. Such shifting shifts the center of mass forward and rearward with respect to the wheels 122, 124, thereby improving control of the torque applied to the wheels for acceleration and deceleration of the mobile carrier 100.

The various implementations of the present disclosure provide advantages over prior art in that the entire vehicle chassis mass, i.e., the entire vehicle mass, minus the hub motors and wheels, serves as the counterweight for stabilizing the vehicle 100. This provides a sizeable amount of torque than previously achievable, and thus allows larger acceleration and deceleration, and accordingly shorter braking distances and quicker responsiveness. In addition, the increased torque allows better performance when the vehicle ascends and descends terrain of varying slope.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A linkage-based shifting apparatus, comprising:
   first and second arms;
   a first wheel rotatably coupled to a proximal end of the first arm;
   a second wheel rotatably coupled to a proximal end of the second arm; and
   a shifting assembly configured to couple to a chassis, the shifting assembly operatively coupled to the first and second arms to cause a relative shifting motion between the chassis and the first and second wheels,
   wherein the shifting assembly further comprises:
       a shifter motor configured to drive a capstan configured to couple to the chassis via a belt or rope; and
       at least one gear coupling the shifter motor to the capstan, including:
           a first gear driven by the shifter motor; and
           a second gear driven by the first gear, wherein the second gear is configured to rotate the capstan.

2. The apparatus of claim 1, wherein the first and second wheels share a common axis of rotation.

3. The apparatus of claim 1, further comprising:
a plurality of motors configured to independently drive the first and second wheels.

4. The apparatus of claim 1, further comprising:
a first pulley system between the first wheel and a first drive motor; and
a second pulley system between the second wheel and a second drive motor.

5. The apparatus of claim 1, wherein the shifting assembly is disposed between the first and second arms.

6. The apparatus of claim 1, wherein the shifting assembly further comprises:
an encoder operatively coupled to the second gear and/or capstan to measure an angle of the second gear.

7. The apparatus of claim 1, wherein the shifting assembly is configured to cause the chassis to shift forward and/or rearward relative to the first and second wheels.

8. The apparatus of claim 1, wherein:
the shifting assembly is configured to cause the chassis to shift forward relative to the first and second wheels for acceleration; and
the shifting assembly is configured to cause the chassis to shift rearward relative to the first and second wheels for deceleration.

9. The apparatus of claim 1, wherein the shifting assembly is configured to cause the chassis to shift forward relative to the first and second wheels to place a body having the chassis in a sitting position when at rest.

10. A mobile carrier system, comprising:
a body having a chassis;
a first wheel rotatably coupled to a first side of the chassis;
a second wheel rotatably coupled to a second side of the chassis;
a cargo volume defined within the body and between the first and second wheels;
a shifting assembly coupled to the chassis and the first and second wheels, the shifting assembly operatively configured to cause a relative shifting motion of the chassis relative to the first and second wheels;
a plurality of motors configured to independently drive the first and second wheels, including a first drive motor and a second drive motor;
a first pulley system between the first wheel and the first drive motor;
a second pulley system between the second wheel and the second drive motor;
a shifter motor configured to drive a capstan configured to couple to the chassis via at least one belt or rope; and
at least one gear coupling the shifter motor to the capstan.

11. The system of claim 10, wherein the shifting assembly is configured to cause the chassis to shift forward and/or rearward relative to the first and second wheels.

12. The system of claim 10, wherein the shifting assembly is configured to cause the chassis to shift forward relative to the first and second wheels for acceleration.

13. The system of claim 12, wherein the shifting assembly is configured to cause the chassis to shift rearward relative to the first and second wheels for deceleration.

14. The system of claim 10, wherein the shifting assembly is configured to cause the chassis to shift forward relative to the first and second wheels to place the body in a sitting position.

15. The system of claim 10, wherein the shifting assembly is configured to cause the chassis to transition from a sitting position forward to an acceleration position, and then rearward to a deceleration position.

16. The system of claim 10, wherein the shifting assembly is configured to cause the chassis to transition from a deceleration position to a sitting position.

17. The system of claim 10, wherein the at least one gear comprises:
a first gear driven by the shifter motor; and
a second gear driven by the first gear, wherein the second gear is configured to rotate the capstan.

18. The system of claim 17, wherein the shifting assembly further comprises:
an encoder operatively coupled to the second gear and/or capstan to measure an angle of the second gear.

* * * * *